US008846991B2

(12) United States Patent
Karjala et al.

(10) Patent No.: US 8,846,991 B2
(45) Date of Patent: Sep. 30, 2014

(54) LIQUID AND GEL-LIKE LOW MOLECULAR WEIGHT ETHYLENE POLYMERS

(75) Inventors: Teresa P. Karjala, Lake Johnson, TX (US); Selim Yalvac, Pearlamd, TX (US); Thomas Karjala, Lake Johnson, TX (US); Daniel D. VanderLende, Sugar Land, TX (US); Brian W. Kolthammer, Lake Jackson, TX (US); James C. Stevens, Richmond, TX (US); Charles F. Diehl, Blue Bell, PA (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 12/817,962

(22) Filed: Jun. 17, 2010

(65) Prior Publication Data

US 2010/0256427 A1    Oct. 7, 2010

Related U.S. Application Data

(63) Continuation of application No. 10/529,530, filed as application No. PCT/US03/30910 on Oct. 1, 2003, now Pat. No. 7,795,365.

(60) Provisional application No. 60/415,595, filed on Oct. 2, 2002, provisional application No. 60/424,880, filed on Nov. 8, 2002.

(51) Int. Cl.
*C07C 11/04* (2006.01)

(52) U.S. Cl.
USPC ............... 585/17; 585/10; 585/12; 528/392; 208/18; 208/19; 526/348; 526/348.2; 526/348.6; 526/348.7; 526/351

(58) Field of Classification Search
USPC ............ 208/18–19, 58; 585/10, 12; 528/392
See application file for complete search history.

(56) References Cited

U.S. PATENT DOCUMENTS

| | | |
|---|---|---|
| 3,645,992 A | 2/1972 | Elston |
| 4,326,972 A | 4/1982 | Chamberlin, III |
| 4,388,202 A | 6/1983 | Nagano et al. |
| 4,668,834 A | 5/1987 | Rim et al. |
| 4,704,491 A * | 11/1987 | Tsutsui et al. ............... 585/10 |
| 4,804,794 A | 2/1989 | Ver Strate et al. |
| 4,874,880 A | 10/1989 | Miya et al. |
| 5,017,299 A | 5/1991 | Gutierrez et al. |
| 5,023,388 A | 6/1991 | Luker |
| 5,044,438 A | 9/1991 | Young |
| 5,057,475 A | 10/1991 | Canich et al. |
| 5,064,802 A | 11/1991 | Stevens et al. |
| 5,096,867 A | 3/1992 | Canich |
| 5,132,380 A | 7/1992 | Stevens et al. |
| 5,151,204 A | 9/1992 | Struglinski |
| 5,153,157 A | 10/1992 | Hlatky et al. |
| 5,198,401 A | 3/1993 | Turner et al. |
| 5,218,071 A | 6/1993 | Tsutsui et al. |
| 5,229,022 A | 7/1993 | Song et al. |
| 5,272,236 A | 12/1993 | Lai et al. |
| 5,275,747 A | 1/1994 | Gutierrez et al. |
| 5,277,833 A | 1/1994 | Song et al. |
| 5,278,272 A | 1/1994 | Lai et al. |
| 5,294,234 A | 3/1994 | Emert et al. |
| 5,296,433 A | 3/1994 | Siedle et al. |
| 5,324,800 A | 6/1994 | Welborn, Jr. et al. |
| 5,366,647 A | 11/1994 | Gutierrez et al. |
| 5,408,017 A | 4/1995 | Turner et al. |
| 5,427,991 A | 6/1995 | Turner |
| 5,482,987 A | 1/1996 | Forschirm |
| 5,495,881 A | 3/1996 | Girard |
| 5,504,049 A | 4/1996 | Crowther et al. |
| 5,554,310 A | 9/1996 | Rossi et al. |
| 5,556,928 A * | 9/1996 | Devore et al. .................. 526/127 |
| 5,599,761 A | 2/1997 | Turner |
| 5,616,664 A | 4/1997 | Timmers et al. |
| 5,621,127 A | 4/1997 | Langhauser et al. |
| 5,625,087 A | 4/1997 | Devore et al. |
| 5,658,865 A | 8/1997 | Yoshida et al. |
| 5,663,129 A | 9/1997 | Emert et al. |
| 5,703,187 A | 12/1997 | Timmers |
| 5,703,257 A | 12/1997 | Rosen et al. |

(Continued)

FOREIGN PATENT DOCUMENTS

| | | |
|---|---|---|
| EP | 0 468 651 A1 | 1/1982 |
| EP | 0200351 A2 | 11/1986 |
| EP | 0 277 003 A1 | 8/1988 |
| EP | 0107282 A2 | 6/1990 |
| EP | 0468537 | 1/1992 |
| EP | 0514828 | 11/1992 |
| EP | 0 520 732 | 12/1992 |
| EP | 0814127 A1 | 12/1997 |
| EP | 0959278 A2 | 11/1999 |
| EP | 1063244 | 12/2000 |

(Continued)

OTHER PUBLICATIONS

Stevens, M.P. (1990). Polymer Chemistry, An Introduction. Oxford University Press, 633 pgs (Office action cites pp. 80-83 & 93-94).*
Soares J.B.P. et al. (2012). "Introduction to Polyolefins," in Polyolefin Reaction Engineering, Wiley, 352 pgs.*
Wittcoff, H.A. et al. (2004). Industrial Organic Chemicals, 2nd ed. New York: Wiley, 662 Pgs.

(Continued)

*Primary Examiner* — Brian McCaig

(57) ABSTRACT

The subject invention pertains to homogeneous liquid low molecular weight ethylene/alpha-olefin polymers having a number average molecular weight (Mn) as determined by gel permeation chromatography, of less than 25,000, a total crystallinity, as measured by DSC, of less than 10%, and a pour point, as measured by ASTM D97, of less than 50° C.

The subject invention also pertains to homogeneous gel-like low molecular weight ethylene/alpha-olefin polymers having a number average molecular weight (Mn) as determined by gel permeation chromatography, of less than 25,000, a total crystallinity, as measured by DSC, of less than 50%, and a pour point, as measured by ASTM D97, of less than 90° C.

10 Claims, No Drawings

(56) References Cited

U.S. PATENT DOCUMENTS

| | | | |
|---|---|---|---|
| 5,705,577 A | 1/1998 | Rossi et al. | |
| 5,710,224 A | 1/1998 | Alt et al. | |
| 5,717,039 A | 2/1998 | Cusumano et al. | |
| 5,723,705 A | 3/1998 | Herrmann et al. | |
| 5,728,855 A | 3/1998 | Smith et al. | |
| 5,731,253 A | 3/1998 | Sangokoya | |
| 5,747,596 A | 5/1998 | Emert et al. | |
| 5,759,967 A | 6/1998 | Song et al. | |
| 5,767,208 A | 6/1998 | Turner et al. | |
| 5,811,379 A * | 9/1998 | Rossi et al. | 508/591 |
| 5,883,204 A | 3/1999 | Spencer et al. | |
| 5,907,021 A | 5/1999 | Turner et al. | |
| 5,912,212 A | 6/1999 | Igarashi et al. | |
| 5,929,147 A | 7/1999 | Pierick et al. | |
| 5,955,639 A | 9/1999 | Oda et al. | |
| 5,962,714 A | 10/1999 | McCullough et al. | |
| 5,965,677 A | 10/1999 | Stephan et al. | |
| 5,965,756 A | 10/1999 | McAdon et al. | |
| 5,972,822 A | 10/1999 | Timmers et al. | |
| 6,008,262 A | 12/1999 | McKay et al. | |
| 6,013,819 A | 1/2000 | Stevens et al. | |
| 6,015,868 A | 1/2000 | Nickias et al. | |
| 6,017,859 A | 1/2000 | Rossi et al. | |
| 6,030,930 A | 2/2000 | Emert et al. | |
| 6,054,544 A | 4/2000 | Finlayson et al. | |
| 6,063,973 A | 5/2000 | Sen et al. | |
| 6,074,977 A | 6/2000 | Rosen et al. | |
| 6,084,046 A | 7/2000 | Johoji et al. | |
| 6,100,224 A | 8/2000 | Peiffer et al. | |
| 6,107,430 A | 8/2000 | Dubois et al. | |
| 6,110,880 A | 8/2000 | Verstrate et al. | |
| 6,120,887 A | 9/2000 | Werenicz et al. | |
| 6,124,513 A | 9/2000 | Heilman et al. | |
| 6,150,297 A | 11/2000 | Campbell, Jr. et al. | |
| 6,221,448 B1 | 4/2001 | Baetzold et al. | |
| 6,232,257 B1 | 5/2001 | Sen et al. | |
| 6,262,324 B1 | 7/2001 | Heilmann et al. | |
| 6,300,398 B1 | 10/2001 | Jialanella et al. | |
| 6,310,164 B1 | 10/2001 | Morizono et al. | |
| 6,319,979 B1 | 11/2001 | Dubois et al. | |
| 6,323,285 B1 | 11/2001 | Johnston et al. | |
| 6,335,410 B1 | 1/2002 | Finlayson et al. | |
| 6,339,112 B1 | 1/2002 | Kauffman et al. | |
| 6,417,416 B1 | 7/2002 | Heilman et al. | |
| 6,462,154 B1 | 10/2002 | Naganuma et al. | |
| 6,534,572 B1 | 3/2003 | Ahmed et al. | |
| 6,579,915 B2 | 6/2003 | Kroll et al. | |
| 6,582,829 B1 | 6/2003 | Quinn et al. | |
| 6,723,810 B2 | 4/2004 | Finlayson et al. | |
| 6,875,816 B2 | 4/2005 | DeGroot et al. | |
| 7,199,180 B1 | 4/2007 | Simmons et al. | |

FOREIGN PATENT DOCUMENTS

| | | |
|---|---|---|
| EP | 1103568 A1 | 5/2001 |
| JP | 61-236804 A | 10/1986 |
| JP | 62-129303 A | 6/1987 |
| WO | WO-88/05792 A1 | 8/1988 |
| WO | WO-88/05793 A1 | 8/1988 |
| WO | WO-93/19104 A1 | 9/1993 |
| WO | WO-93/21238 A2 | 10/1993 |
| WO | WO-93/21242 A1 | 10/1993 |
| WO | WO-93/25590 A1 | 12/1993 |
| WO | WO-94/00500 A1 | 1/1994 |
| WO | WO-94/03506 A1 | 2/1994 |
| WO | WO-94/19436 A2 | 9/1994 |
| WO | WO-95/00526 A1 | 1/1995 |
| WO | WO-96/00244 A1 | 1/1996 |
| WO | WO-96/13530 A1 | 5/1996 |
| WO | WO-96/23010 A2 | 8/1996 |
| WO | WO-97/22635 A1 | 6/1997 |
| WO | WO-97/42241 A1 | 11/1997 |
| WO | WO-98/41529 A1 | 9/1998 |
| WO | WO-98/50392 A1 | 11/1998 |
| WO | WO-99/14250 A1 | 3/1999 |
| WO | WO-01/18109 A1 | 3/2001 |
| WO | WO-02/14384 A2 | 2/2002 |

OTHER PUBLICATIONS

Mecking, S. (2001). "Olefin polymerization by late transition metal complexes—a root of Ziegler catalysts gains new ground." Angew. Chem. Int. Ed., 40(3), pp. 534-540.

Younkin, T.R. et al. (2000). "Neutral, single-component nickel (II) polyolefin catalysts that tolerate heteroatoms." Science, 287, 460, pp. 460-462.

Johnson, L.K. et al. (1995). "New Pd(II)- and Ni(II)- based catalysts for polymerization of ethylene and alpha-olefins." Journal of the American Chemical Society, 117, pp. 6414-6415.

Opposition by Clariant Dec. 19, 2006 (5 pages).

Opposition by Clariant Dec. 19, 2006, English Translation (5 pages).

Dow's Response to Notice of Opposition Nov. 1, 2007 (4 pages).

Dow's Claim Set in Response to Notice of Opposition Nov. 1, 2007 (12 pages).

Dow's Declaration in Response to Notice of Opposition Nov. 1, 2007 (4 pages).

EPO Communication, Further Examination of Opposition Nov. 23, 2007 (3 pages).

Clariant's Reply to Examination Report in Opposition Mar. 18, 2008 (3 pages).

Clariant's Reply to Examination Report in Opposition Mar. 18, 2008, English Translation (3 pages).

EPO Communication, Further Examination of Opposition Apr. 29, 2008 (3 pages).

Dow's reply to Examination Report in Opposition Oct. 27, 2008 (4 pages).

Dow's claim set (Main Request) in Reply to Examination Report in Opposition Oct. 27, 2008 (12 pages).

Dow's claim set (First Auxiliary Request) in Reply to Examination Report in Opposition Oct. 27, 2008 (12 pages).

Abstract—36 Soft Materials, Hard Results—RPA 20-00 791984.

Abstract—37 Tube Turnaround—RPA 20-00 791969.

Abstract—38 Synthesis of Branched Polyethylene Fluids for use in Lubricant Compositions—RPA 20-00 791960.

Abstract—39 Blends of Polyolefins and Poly (Ethylene Oxide) and process for making the blends RPA 20-00 791925.

Abstract—40 Solubilized hydrophobically—modified Alkali-soluable Emulsion Polymers—RPA 20-00.

Abstract—41 Dur-O-Set E-171 HS (78-6995)—RPA 20-00 791876.

Abstract—42 Pet Packaging Solutions—RPA 20-00 791875.

Reasons for Decision 62144B-EP Opposition; Nov. 2, 2010 (7 pages).

Minutes of 62144B-EP Opposition Oral Proceedings; Nov. 3, 2010 (30 pages).

* cited by examiner

LIQUID AND GEL-LIKE LOW MOLECULAR WEIGHT ETHYLENE POLYMERS

The present application is a continuation of U.S. application Ser. No. 10/529,530, filed on Mar. 29, 2005, now U.S. Pat. No. 7,795,365, which is a 35 U.S.C. §371 National Phase Application of International Application No. PCT/US03/30910, filed on Oct. 1, 2003, which claims priority to U.S. Provisional Application No. 60/415,595, filed on Oct. 2, 2002, and U.S. Provisional Application No. 60/424,880, filed on Nov. 8, 2002. Each application is incorporated herein by reference.

The subject invention pertains to homogeneous liquid low molecular weight ethylene/alpha-olefin polymers having a number average molecular weight (Mn) as determined by gel permeation chromatography, of less than 25,000, a total crystallinity, as measured by DSC, of less than 10%, and a pour point, as measured by ASTM D97, of less than 50° C.

The subject invention also pertains to homogeneous gel-like low molecular weight ethylene/alpha-olefin polymers having a number average molecular weight (Mn) as determined by gel permeation chromatography, of less than 25,000, a total crystallinity, as measured by DSC, of less than 50%, and a pour point, as measured by ASTM D97, of less than 90° C.

Ethylene polymers are typically characterized in terms of their density and molecular weight. The terms "ultra low density polyethylene" (ULDPE) and "linear very low density polyethylene" (LVLDPE) have been used interchangeably in the polyethylene art to designate the polymer subset of linear low density polyethylenes having a density less than or equal to about 0.915 g/cm$^3$. The term "linear low density polyethylene" (LLDPE) is then applied to those linear polyethylenes having a density above about 0.915 g/cm$^3$. Although the density of such polymers is typically controlled by varying the amount of comonomer in the ethylenic polymer, in a practical sense the lowest density attainable for ethylenic polymers is a function of the comonomer incorporation capacity of the catalyst used to effect the polymerization.

The polymerization or copolymerization of ethylene in the presence of traditional transition metal Ziegler catalysts results in the formation of heterogeneous linear polymers which are solid and typically have an effective density limit of approximately 0.90 g/cm$^3$ However, with the advent of the so called "single-site" catalysts, this low density limit has been lowered still further due to the improved comonomer incorporation capacity of such systems. Single-site catalysts, including metallocenes, (which are organometallic compounds containing one or more cyclopentadienyl ligands attached to a metal, such as hafnium, titanium, vanadium, or zirconium) generate homogeneous linear ethylene/alpha olefin copolymers. U.S. Pat. No. 3,645,992, by Elston, discloses homogeneous linear ethylene olefin copolymers prepared using a soluble vanadium catalyst. Therein, homogeneous copolymers are defined as polymers in which the comonomer is randomly distributed within a given molecule, and wherein substantially all copolymer molecules have the same ethylene to comonomer ratio. The homogeneous polymers are also defined as having a narrow composition distribution, that is they have only a single melting peak and essentially lack a measurable "linear" polymer fraction.

U.S. Pat. Nos. 5,272,236 and 5,278,272, disclose substantially linear ethylene olefin copolymers prepared using a single site constrained geometry polymerization catalyst. The disclosed substantially linear copolymers are characterized as having from about 0.01 to about 3 long chaintranches per 1000 carbons. Unlike the homogeneous copolymers of Elston, the disclosed substantially linear copolymers are characterized by a molecular weight distribution ($M_w/M_n$) which is independent of the $I_{10}/I_2$, as measured in accordance with ASTM D-1238.

In addition to polymer density, the molecular weight of an ethylenic polymer varies greatly depending on the application for which it is to be used. In general, for most functions requiring fabrication of the polymer into an article (for instance films, foams, fibers, or molded articles) reasonably high molecular weights are required, typically, in excess of 30,000 number average molecular weight (Mn).

However, when such polymers are used as an additive to an existing composition, such molecular weight limits can be lowered still further, depending on the aspect of performance of the final composition that the polymer additive is being used to improve. Polymeric additives are used for example in compositions used for coatings, adhesives, processing additives, lubricants and fuel additives, emulsifiers, plasticizers (for improvement of properties such as glass transition temperature ("Tg"), sealants and caulks, textiles, fiber/fabric coating, protective coatings, and binders as well as cling additives. A typical application of an ethylenic polymer additive in such formulations would be to vary the final viscosity. Typically, to increase the viscosity of the formulation, a high molecular weight polymer additive would be used, whereas to lower the viscosity of the formulation, a low molecular weight polymer would be used.

In addition to viscosity modifiers, polymer additives can also be used as dispersants in a number of applications. For instance, synthetic hydrocarbon oils typically comprise a mixture of at least one hydrocarbon base oil and one or more polymeric additives. Typically dispersant additives are used in lubricating oils to maintain any insoluble materials, formed by oxidation, in suspension thereby preventing sludge flocculation and precipitation. To date, such dispersants are mainly formed by derivitization of olefin polymers such as polyisobutylene, the high level of unsaturation in which can be used as a site for functionalization with polar molecules (for example maleic anhydride-grafting on the polymer double bonds). This further functionalization with polar groups improves the dispersant properties of the polymers in such lubricating oil compositions. Ethylenic polymers have also been used in this dispersant application. For instance WO 94/19436 discloses ethylene/butene copolymers prepared using a bis-cyclopentadienyl metallocene catalyst with a pour point of −30° C. or less, a Mn of 1500-7500 and ethylene content less than or equal to 50 weight percent and where at least 30% of all polymer chains are terminated with ethylvinylidene groups. These groups were then further functionalized with polar moieties to improve the dispersant properties. Other uses of polymeric additives in oil compositions include the prevention of the crystallization of waxes and other polymeric moieties when the oil is cooled to temperatures approaching its pour point (that is the lowest temperature at which an oil will flow). This ability to prevent wax crystallization can be important in drilling, recovery and transport of oil from underground, as such operations typically result in cooling of the oil when it reaches the well head, and wax crystallization can lead to plugging of downstream oil transfer systems. Thus, the addition of polymer additives which have a beneficial effect on pour point (that is, having a low pour point, especially as compared to the ambient surrounding temperature) would greatly improve operations requiring screening, filtering and pumping the oil, by reducing the tendency to clog such equipment and minimize the requirement for remedial measures such as localized heating of transfer equipment or mechanical unplugging of blocked lines. Similarly if polymer additives are included in the composition for other reasons, they must not adversely (increase) the pour point of the final oil compositions, for the reasons mentioned above.

U.S. Pat. No. 6,262,324 B1, discloses a process for production of ethylene alpha olefin copolymers and terpolymers having 50-75 mol % ethylene, a molecular weight of less than 2000, a molecular weight distribution of less than 2.5, a head to tail molecular structure with a random monomer distribution, a bromine number >2, and a pour point of less than 0° C. wherein the copolymer is obtained by cracking a precursor polymer prepared using a metallocene/alumoxane catalyst system.

WO 01/18109 A1 discloses plasticizers for polypropylene which are low molecular weight ethylene/alpha olefin copolymers which are miscible with polypropylene and have a molecular weight, Mw, of 500 to 10,000, a molecular weight distribution, $M_w/M_n$, as determined by gel permeation chromatography, of from about 1.5 to about 3. And a comonomer content from 20 to 70 mol, a Tg of heater than or equal to –80° C. to less than or equal to –30° C. and a crystallinity of less than or equal to 5% and prepared using a metallocene/alumoxane catalyst system.

U.S. Pat. No. 6,017,859, discloses ethylene/alpha-olefin copolymers having a Mn of 300-15000, an average ethylene sequence length from 1-3, an average of at least 5 branches per 100 carbon atoms, with greater than or equal to 50% of these branches being methyl and/or ethyl branches and where at least 30% of the polymer chains are terminated with a vinyl or vinylene group, and less than or equal to 15% of the polymer chains are terminated by vinylidene groups, and tri-substituted olefinic groups. The polymer was prepared using a metallocene/alumoxane catalyst system.

U.S. Pat. Nos. 6,054,544 and 6,335,410 B1, disclose non-pourable ethylene polymers having a narrow molecular weight distribution, that is, an $M_w/M_n$ less than 2.5, and an ultra-low molecular weight, as evidenced by a number average molecular weight (Mn) of no more than 11,000 and having crystallinity as measured by DSC between 10 and 80%.

In addition to having low molecular weight and density, it would be highly useful if such polymeric additives were also available in liquid form, which would not only facilitate any transfer and delivery system for such an additive but also improve any mixing of such an additive into a liquid composition. In addition, such polymers in liquid form would then not only be available as an additive to an oil, but could themselves be used as the base material for lubricant compositions. The liquid form would also facilitate easy addition of the polymer additive with little or no need for heating to blend in with other components in all the previously mentioned applications.

U.S. Pat. No. 6,063,973, discloses highly branched synthetic polyethylene fluids having high viscosity indices (94-145 VI), low pour points (–60° C. to –10° C.) and a branching index of from about 151 to 586 branches per 1000 —$CH_2$ groups. The branched structure of the polymers was obtained by polymerizing ethylene in the presence of a $TaCl_5/AlEtCl_2$ or $TiCl_4/AlEtCl_2$ catalyst system U.S. Pat. No. 4,704,491, discloses a liquid ethylene/alpha olefin random copolymer having an ethylene content of 10-85 mol %, a number average molecular weight (Mn) as determined by gel permeation chromatography, from 300-10,000, a molecular weight distribution, $M_w/M_n$, as determined by gel permeation chromatography, of from about 1.5 to about 2.5, an iodine value of 0-85,—a viscosity index of 130 to 350, an ignition point of at least 240° C. and a pour point of less than or equal to 0° C.

In addition to being liquid, a polymeric additive having a substantially amorphous structure could greatly increase the miscibility with the base polymer systems. The low Tg of such additive polymers would result in improved low temperature properties, either by itself or into materials to which it was compounded.

Thus, it would be highly advantageous to have available homogeneous liquid low molecular weight ethylene/alpha olefin copolymers made with a single site catalyst system, which have high comonomer levels, are nearly completely amorphous (that is total percent crystallinity of less than 10, preferably less than 5, more preferably less than 2%), as well as being liquid and having low glass transition temperatures. This will provide for improved compatibility with other materials, easy blending, and the ability to modify flow behavior and properties of the final formulation, thus furthering their use in a variety of applications. Finally, as such polymers are in liquid form they may also be used not only as an additive but as the base material for synthetic oil compositions.

Specifically, the present invention pertains to homogeneous liquid low molecular weight ethylene/alpha-olefin polymers having a number average molecular weight (Mn) as determined by gel permeation chromatography, of less than 25,000, a total crystallinity of less than 10%, and a pour point as measured by ASTM D97 of less than 50° C.

In another embodiment of the present invention, homogeneous gel-like low molecular weight ethylene/alpha-olefin polymers having a number average molecular weight (Mn) as determined by gel permeation chromatography, of less than 25,000, a total crystallinity of less than 50%, and a pour point as measured by ASTM D97 of less than 90° C. Although not liquid, the gel-like polymers of the present invention have some of the advantages of the liquid polymers, including improved compatibility with other materials, easy blending, and the ability to modify flow behavior and properties of the final formulation.

The present invention further provides a process for preparing the liquid homogeneous low molecular weight ethylene polymers of the invention comprising: reacting ethylene and at least one ethylenically unsaturated comonomer at a reaction temperature of at least 80° C. in the presence of a single site catalyst to form a liquid homogeneous low molecular weight ethylene/alpha-olefin polymer, having a number average molecular weight (Mn) as determined by gel permeation chromatography, of less than 25,000, a total crystallinity of less than 10% and a pour point as measured by ASTM D97 of less than 50° C.

In one embodiment of this process, the polymerization is conducted at sufficiently high comonomer levels so as not to require the addition of hydrogen in the reactor to generate the desired low molecular weight liquid polymer.

The present invention further provides a process for preparing the gel-like homogeneous low molecular weight ethylene polymers of the invention comprising: reacting ethylene and at least one ethylenically unsaturated comonomer at a reaction temperature of at least 80° C. in the presence of a single site catalyst to form a liquid homogeneous low molecular weight ethylene/alpha-olefin polymer, having a number average molecular weight (Mn) as determined by gel permeation chromatography, of less than 25,000, a total crystallinity of less than 50%, and a pour point as measured by ASTM D97 of less than 90° C.

In one embodiment of this process, the polymerization is conducted at sufficiently high comonomer levels so as not to require the addition of hydrogen in the reactor to generate the desired low molecular weight gel-like polymer.

The homogeneous liquid- and gel-like low molecular weight, high comonomer content-polymers of the present invention will find utility where they offer enhanced performance over currently available low molecular weight polymers. Major applications for these polymers include coatings, adhesives, processing additives, lubricants, fuel and oil pour point and wax crystallization reduction additives, viscosity index improvers, shear stabilizers, tackifiers, processing aids, compatibilizers, emulsifiers, plasticizers (for improvement of properties such as Tg), sealants and caulks, textiles, fiber/fabric coating, protective coatings, and binders. The above described polymers will also find utility in formulated products, in combination with a wide range of other polymers, copolymers, fillers, waxes, pigments, additives, and processing aids.

Also, as the homogeneous liquid- and gel-like low molecular weight, high comonomer content-polymers of the present invention have lower viscosities than higher molecular weight polymers, and are compatible with many other polymers (for example polyolefins, styrenic block copolymers, ethylene acrylic acid copolymers) they can thus be used by compounders and processors to modify their products and provide flow enhancement without physical property losses associated with oils (such as loss of impact and migration to the surface affecting printability, tactile feel and dirt pick up). The polymers of the present invention can also enhance polymer adhesion in extrusion coating and lamination systems when used as a blend component.

Yet another advantage of the polymers of the present invention is that their low crystallinities allow them to be loaded with high levels of fillers (for example, talc, carbon black, silica, magnesium hydroxide, calcium carbonate, aluminum trihydrate, etc.) and/or other additives such as antioxidants (for example, Irganox 1010, a hindered phenolic; Irgafos 168, a phosphite; etc.), cling additives (for example, polyisobutylene), antiblock additives, colorants, pigments, waxes, nucleating agents, extender oils, flame retardants, and tackifers. The amount of filler that can incorporated into the polymer is limited only by the molecular structure of the filler-containing composition and/or the extent that the filler does not interfere with the other enhancements brought by the polymer. Solids levels of 70 wt %, 80 wt % or more based on the combined weight of the polymer composition and filler may be achieved. This high loading capacity is particularly useful in masterbatch applications, for example, using a relatively small amount of polymer to introduce one or more fillers and/or additives into a much larger amount of a composition.

Thus, high filler loadings can then be dispersed in other polymers more effectively due to the liquid polymers improved flow characteristics. In addition, their low viscosity provides better additive dispersion without excessive heat and shear thereby minimizing any polymer degradation. These excellent dispersion characteristics may also enhance the efficiency of the filler and improve its performance (such as for example improving the clarity of any color concentrates dispersed in the liquid polymer). The ease of processing of such liquid polymer masterbatches which are highly filled can yield compounders a cost savings via increased additive throughput and less off-grade resulting from polymer degradation. Finally, the low viscosity and melting points of the liquid polymers can result in lower process temperatures for heat sensitive additives such as blowing and cross-linking agents.

The above described polymers, and compositions comprising one or more said interpolymers and having enhanced processing/property balances can be fabricated into a range of different structures including foams, fibers, films, injection molded articles, compression molded articles, thermoformed articles extruded articles, calendered articles, hot melt adhesives, pressure sensitive adhesives, sealant compositions, as binders for fillers, pigments and as carriers for additive packages.

These and other embodiments of the claimed invention are more fully set forth in the Detailed Description set forth below.

DETAILED DESCRIPTION OF THE INVENTION

Unless indicated otherwise, the following testing procedures are to be employed:

Molecular weight is determined using gel permeation chromatography (GPC) on a Waters 150° C. high temperature chromatographic unit equipped with three mixed porosity columns (Polymer Laboratories 103, 104, 105, and 106), operating at a system temperature of 140° C. The solvent is 1,2,4-trichlorobenzene, from which 0.3 percent by weight solutions of the samples are prepared for injection. The flow rate is 1.0 mL/min. and the injection size is 100 microliters.

The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968) to derive the following equation:

$$M_{polyethylene}=a*(M_{polystyrene})^b.$$

In this equation, a=0.4316 and b=1.0.

Number average molecular weight, $M_n$, of a polymer is expressed as the first moment of a plot of the number of molecules in each molecular weight range against the molecular weight. In effect, this is the total molecular weight of all molecules divided by the number of molecules and is calculated in the usual manner according to the following formula:

$$Mn=\Sigma n_i * M_i / \Sigma n_i = \Sigma w_i / \Sigma (w_i/M_i)$$

where
$n_i$=number of molecules with molecular weight $M_i$
$w_i$=weight fraction of material having molecular weight $M_i$
and $\Sigma n_i$=total number of molecules Weight average molecular weight, $M_W$, is calculated in the usual manner according to the following formula: $M_W=\Sigma w_i * M_i$, where $w_i$ and $M_i$ are the weight fraction and molecular weight, respectively, of the $i^{th}$ fraction eluting from the GPC column.

The ratio of these two averages, the molecular weight distribution (MWD or $M_w/M_n$), is used herein to define the breadth of the molecular weight distribution.

Melt viscosity is determined in accordance with the following procedure using a Brookfield Laboratories DVII+ Viscometer in disposable aluminum sample chambers. The spindle used is a SC-31 hot-melt spindle, suitable for measuring viscosities in the range of from 10 to 100,000 centipoise. The sample was poured in the chamber, which is in turn inserted into a Brookfield Thermosel and locked into place with bent needle-nose pliers. The sample chamber has a notch on the bottom that fits the bottom of the Brookfield Thermosel to ensure that the chamber is not allowed to turn when the spindle is inserted and spinning. The sample is heated to the required temperature with additional sample being added until the melted sample is about 1 inch below the top of the sample chamber. The viscometer apparatus is lowered and the spindle submerged into the sample chamber. Lowering is continued until brackets on the viscometer align on the Thermosel. The viscometer is turned on, and set to a shear rate which leads to a torque reading in the range of 30 to 60 percent. Readings are taken every minute for about 15 minutes, or until the values stabilize, which final reading is recorded.

Percent crystallinity is determined by differential scanning calorimetry using a TA Q1000 at 10 C/min. The sample was heated to 180 C and maintained at that temperature for 3 minutes. It was then cooled at 10 C/min to −90 C. It was then heated at 10 C/min to 150 C. The melting temperatures and percent crystallinity are reported from the second heat curve. The percent crystallinity may be calculated with the equation:

$$\text{percent } C = (A/292 \text{ J/g}) \times 100,$$

wherein percent C represents the percent crystallinity, and A represents the heat of fusion of the measured ethylene based polymer in J/g. The melting point, crystallization point and glass transition temperature were also determined by this method.

Pour point is determined using ASTM D-97.
Kinematic viscosity is determined using ASTM D445.
Density is measured substantially in accordance with ASTM D-792 using the following procedure:
1. A glass sinker, exactly 10,0000 ml in vol, manufactured by Mettler is weighed in air.
2. The sinker is suspended below an analytical balance.
3. The sinker is then placed into the liquid.
3. The difference in the buoyant weight and weight in air of the sinker is determined. This delta is equal to the weight of 10,0000 ml of the liquid according to Archimedes Principle.
4. The difference in the weight of the sinker is divided by 10,0000 and this is the reported density of the liquid in g/cm$^3$ (accurate to 3 significant figures).

Octene incorporation is determined using $^{13}$C NMR analysis using the following procedures:
1) Approximately 0.5 g of Polymer is Placed in a 10-mm NMR Tube.

Approximately 1 g of solvent is added to the tube, which is then capped and placed in a heating block at approximately 130 C for 20-30 minutes to melt the polymer. The tube is removed from the heating block and allowed to cool. The sample is brought to its final volume by adding 2 g of solvent. The solvent used is a 50/50 mixture of orthodichlorobenzene and tetrachloroethane-d$_2$ that is 0.025M in chromium acetylacetonate (relaxation agent). The uncapped tubes are placed in the nitrogen box for approximately 20 minutes to prevent oxidation of the sample while heating. The samples are capped and then returned to the heating block at approximately 130 C to dissolve the polymer. A heat gun is periodically used to gently reflux the sample for thorough homogenization.

2) Data Acquisition
$^{13}$C NMR spectra of ethylene/octene polymer samples are acquired on a 400 MHz NMR spectrometer. The samples are allowed to equilibrate for approximately 1 hour in the spectrometer. The samples are shimmed by optimizing the deuterium lock signal. The acquisition parameters used to collect the $^{13}$C NMR data are as follows:
Block size=32K
Sweep width=24,200 Hz
pulse width=90°
number of scans=4000
temperature=130° C.
recycle time=6 s $^{13}$C NMR analysis of the propylene/ethylene copolymers was used to determine and ethylene and propylene content using the following procedure;
$^{13}$C NMR Analysis The samples were prepared by adding approximately 3 g of a 50/50 mixture of tetrachloroethane-d2/orthodichlorobenzene that is 0.025M in chromium acetylacetonate (relaxation agent) to 0.4 g sample of polymer in a 10 mm NMR tube. The samples were dissolved and homogenized by heating the tube and its contents to 150° C. The data was collected using a Varian Unity Plus 400 MHz spectrometer, corresponding to a $^{13}$C resonance frequency of 100.4 MHz. Acquisition parameters were selected to ensure quantitative $^{13}$C data acquisition in the presence of the relaxation agent. The data was acquired using gated $^1$H decoupling, 4000 transients per data file, a 6 sec pulse repetition delay, spectral width of 24,200 Hz and a file size of 32K data points, with the probe head heated to 130° C.

End Group Analysis
End Group analysis of all samples was performed using $^1$H NMR using the following procedure;

The samples were prepared by adding approximately 0.100 g of polymer in 2.5 ml of solvent in a 10 mm NMR tube. The solvent is a 50/50 mixture of 1,1,2,2-tetrachloroethane-d2 and perchlorethylene. The samples were dissolved and homogenized by heating and vortexing the tube and its contents at 110° C. The data was collected using a Varian Unity Plus 400 MHz NMR spectrometer. The acquisition parameters used for the Presat experiment include a pulse width of 30 µs, 200 transients per data file, a 1.6 sec acquisition time, a spectral width of 10000 Hz, a file size of 32K data points, temperature setpoint 110° C., D1 delay time 4.40 sec, Satdly 4.0 sec, and a Satpwr of 16.

The term "homogeneous polymer" means that in an ethylene/α-olefin interpolymer (1) the α-olefin comonomer is randomly distributed within a given polymer molecule, (2) substantially all of the polymer molecules have the same ethylene-to-comonomer ratio, and (3) the interpolymer essentially lacks a measurable high density (crystalline) polymer fraction as measured by known fractionation techniques such as, for example, a method that involves polymer fractional elutions as a function of temperature. Examples of homogeneous polymers include the substantially linear polymers defined as in U.S. Pat. No. 5,272,236 (Lai et al.), in U.S. Pat. No. 5,278,272, U.S. Pat. No. 6,054,544 and U.S. Pat. No. 6,335,410 B.

The term "interpolymer" is used herein to indicate a copolymer, or a terpolymer, or the like. That is, at least one other comonomer is polymerized with ethylene to make the interpolymer.

The term "liquid polymer" is used herein, to indicate a homogeneous ethylene/alpha-olefin polymer having a number average molecular weight (Mn) as determined by gel permeation chromatography, of less than 25,000, a total crystallinity of less than 10%, and a pour point as measured by ASTM D97 of less than 50° C.

The term "gel-like polymer" is used herein to indicate a homogeneous ethylene/alpha-olefin polymer having a number average molecular weight (Mn) as determined by gel permeation chromatography, of less than 25,000, a total crystallinity of less than 50%, and a pour point as measured by ASTM D97 of less than 90° C.

The liquid and gel-like polymers of the present invention will be a homogeneous polymer of ethylene with at least one ethylenically unsaturated monomer, conjugated or nonconjugated diene, polyene, etc.

The homogeneous liquid and gel-like low molecular weight ethylene/alpha olefin polymers of the invention may be interpolymers of ethylene and at least one suitable comonomer. Preferred comonomers include $C_{3-20}$ α-olefins (especially propylene, isobutylene, 1-butene, 1-hexene, 3-methyl-1-pentene, 4-methyl-1-pentene, 1-hexene, and 1-octene), $C_{4-40}$ non-conjugated dienes, styrene, alkyl-substituted styrene, tetrafluoroethylene, vinylbenzocyclobutene, 1,4-hexadiene, naphthenics (for example, cyclopentene, cyclohexene and cyclooctene), and mixtures thereof. Most preferred are propylene and 1-octene.

When ethylene propylene diene terpolymers (EPDM's) are prepared, the dienes are typically non-conjugated dienes having from 6 to 15 carbon atoms. Representative examples of suitable non-conjugated dienes that may be used to prepare the terpolymers include:
(a) Straight chain acyclic dienes such as 1,4-hexadiene; 1,5-heptadiene; and 1,6-octadiene;
(b) Branched chain acyclic dienes such as 5-methyl-1,4-hexadiene; 3,7-dimethyl-1,6-octadiene; and 3,7-dimethyl-1,7-octadiene;
(c) Single ring alicyclic dienes such as 4-vinylcyclohexene; 1-allyl-4-isopropylidene cyclohexane; 3-allylcyclopentene; 4-allylcyclohexene; and 1-isopropenyl-4-butenylcyclohexene;
(d) Multi-ring alicyclic fused and bridged ring dienes such as dicyclopentadiene; alkenyl, alkylidene, cycloalkenyl, and cycloalkylidene norbornenes, such as 5-methylene-2-norbornene; 5-methylene-6-methyl-2-norbornene; 5-methylene-6,6-dimethyl-2-norbornene; 5-propenyl-2-norbornene; 5-(3-cyclopentenyl)-2-norbornene; 5-ethylidene-2-norbornene; 5-cyclohexylidene-2-norbornene; etc.

The preferred dienes are selected from the group consisting of 1,4-hexadiene; dicyclopentadiene; 5-ethylidene-2-norbornene; 5-methylene-2-norbornene; 7-methyl-1,6 octadiene; 4-vinylcyclohexene; etc. One preferred conjugated diene which may be employed is piperylene.

Most preferred monomers are ethylene, propylene and ethylidenenorbornene, or mixtures of ethylene and a $C_{3-8}$ α-olefin, and most especially propylene and 1-octene.

The homogeneous liquid and gel-like low molecular weight ethylene/alpha olefin polymers of the invention will be characterized by a number average molecular weight (Mn) of less than 25,000, more preferably less than 15,000, even more preferably less than 11,000, and most preferably less than 9,000. Using the process of the invention, number average molecular weights of less than 5000 may be obtained.

The homogeneous liquid and gel-like low molecular weight ethylene/alpha olefin polymers will be characterized by a melt viscosity at 150° C. of less than 20,000, preferably less than 10,000, more preferably less than 5,000 and most preferably less than 1000 cP, with melt viscosities at 150° C. of less than 500 cP being easily attained. However, if a diene is a component of the low molecular weight liquid polymer, the melt viscosity at 100° C. is preferably less than 120,000 cP.

The homogeneous liquid and gel-like low molecular weight ethylene/alpha olefin polymers of the invention will have a Tg of less than −30° C., preferably less than −50° C., preferably less than −60° C.

The homogeneous liquid low molecular weight ethylene/alpha olefin polymers of the invention will be substantially amorphous and have a total percent crystallinity of less than 10%, preferably less than 7%, more preferably less than 5% and even more preferably less than 2%, as measured by DSC.

The homogeneous gel-like low molecular weight ethylene/alpha olefin polymers of the invention will have a total percent crystallinity of less than 50%, preferably less than 40%, more preferably less than 30% and even more preferably less than 20%, as measured by DSC.

The homogeneous liquid low molecular weight ethylene/alpha olefin polymers of the invention will have a comonomer incorporation in the final polymer greater than 15, preferably greater than 30, more preferably greater than 40 and even more preferably greater than 50 mol %.

The homogeneous gel-like low molecular weight ethylene/alpha olefin polymers of the invention will have a comonomer incorporation in the final polymer greater than 10, preferably greater than 12, more preferably greater than 13 and even more preferably greater than 15 mol %.

The homogeneous liquid or gel-like low molecular weight ethylene/alpha olefin polymers of the invention will typically have a density of less than 0.870 g/cm$^3$.

The homogeneous liquid low molecular weight ethylene/alpha olefin polymers of the invention will typically have a level of vinylidenes in the polymer of less than 35, preferably less than 30, more preferably less than 25, and even more preferably less than 20% per chain (based on Mn).

The homogeneous gel-like low molecular weight ethylene/alpha olefin polymers of the invention will typically have a level of vinylidenes in the polymer of less than 15, preferably less than 10, more preferably less than 5, and even more preferably less than 3% per chain (based on Mn).

The homogeneous liquid low molecular weight ethylene/alpha olefin polymers of the invention are characterized as having a pour point of less than 50° C. as determined by ASTM D-97. Preferably, the pour point will be less than 40° C., more preferably less than 25° C. and even more preferably less than 15° C., and most preferably less than 0° C.

The homogeneous gel-like low molecular weight ethylene/alpha olefin polymers of the invention are characterized as having a pour point of less than 90° C. as determined by ASTM D-97. Preferably, the pour point will be less than 80° C., more preferably less than 70° C. and even more preferably less than 60° C., and most preferably less than 40° C.

The homogeneous liquid and gel-like low molecular weight ethylene/alpha olefin polymers of the invention may be prepared using the constrained geometry catalysts disclosed in U.S. Pat. No. 5,064,802, No. 5,132,380, No. 5,703,187, No. 6,034,021, EP 0 468 651, EP 0 514 828, WO 93/19104, and WO 95/00526. Another suitable class of catalysts is the metallocene catalysts disclosed in U.S. Pat. No. 5,044,438; No. 5,057,475; No. 5,096,867; and No. 5,324,800. It is noted that constrained geometry catalysts may be considered as metallocene catalysts, and both are sometimes referred to in the art as single-site catalysts.

For example, catalysts may be selected from the metal coordination complexes corresponding to the formula:

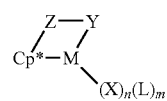

Formula I wherein: M is a metal of group 3, 4-10, or the lanthanide series of the periodic table of the elements; Cp* is a cyclopentadienyl or substituted cyclopentadienyl group bound in an $\eta^5$ bonding mode to M; Z is a moiety comprising boron, or a member of group 14 of the periodic table of the elements, and optionally sulfur or oxygen, the moiety having up to 40 non-hydrogen atoms, and optionally Cp* and Z together form a fused ring system; X independently each occurrence is an anionic ligand group, said X having up to 30 non-hydrogen atoms; n is 2 less than the valence of M when Y is anionic, or 1 less than the valence of M when Y is neutral; L independently each occurrence is a neutral Lewis base ligand group, said L having up to 30 non-hydrogen atoms; m is 0, 1, 2, 3, or 4; and Y is an anionic or neutral ligand group bonded to Z and M comprising nitrogen, phosphorus, oxygen or sulfur and having up to 40 non-hydrogen atoms, optionally Y and Z together form a fused ring system.

Suitable catalysts may also be selected from the metal coordination complex corresponds to the formula:

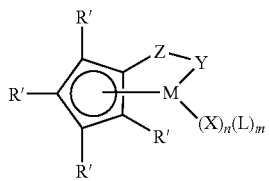

Formula II wherein R' each occurrence is independently selected from the group consisting of hydrogen, alkyl, aryl, silyl, germyl, cyano, halo and combinations thereof having up to 20 non-hydrogen atoms; X each occurrence independently is selected from the group consisting of hydride, halo, alkyl, aryl, silyl, germyl, aryloxy, alkoxy, amide, siloxy, and combinations thereof having up to 20 non-hydrogen atoms; L independently each occurrence is a neural Lewis base ligand having up to 30 non-hydrogen atoms; Y is —O—, —S—, —NR*—, —PR*—, or a neutral two electron donor ligand selected from the group consisting of OR*, SR*, NR*$_2$, PR*$_2$; M, n, and m are as previously defined; and Z is SIR*$_2$, CR*$_2$, SiR*$_2$SiR*$_2$, CR*$_2$CR*$_2$, CR*=CR*, CR*$_2$SiR*$_2$, GeR*$_2$, BR*, BR*$_2$; wherein: R* each occurrence is independently selected from the group consisting of hydrogen, alkyl, aryl, silyl, halogenated alkyl, halogenated aryl groups having up to 20 non-hydrogen atoms, and mixtures thereof, or two or more R* groups from Y, Z, or both Y and Z form a fused ring system.

It should be noted that whereas formula I and the following formulas indicate a monomeric structure for the catalysts, the complex may exist as a dimer or higher oligomer.

Further preferably, at least one of R', Z, or R* is an electron donating moiety. Thus, highly preferably Y is a nitrogen or phosphorus containing group corresponding to the formula —N(R"")— or —P(R"")—, wherein R"" is $C_{1-10}$ alkyl or aryl, that is, an amido or phosphido group.

Additional catalysts may be selected from the amidosilane- or amidoalkanediyl-compounds corresponding to the formula:

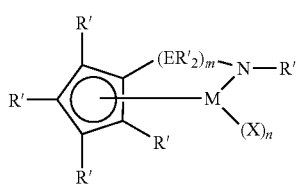

Formula III wherein: M is titanium, zirconium or hafnium, bound in an $\eta^5$ bonding mode to the cyclopentadienyl group; R' each occurrence is independently selected from the group consisting of hydrogen, silyl, alkyl, aryl and combinations thereof having up to 10 carbon or silicon atoms; E is silicon or carbon; X independently each occurrence is hydride, halo, alkyl, aryl, aryloxy or alkoxy of up to 10 carbons; m is 1 or 2; and n is 1 or 2 depending on the valence of M.

Examples of the above metal coordination compounds include, but are not limited to, compounds in which the R' on the amido group is methyl, ethyl, propyl, butyl, pentyl, hexyl, (including isomers), norbornyl, benzyl, phenyl, etc.; the cyclopentadienyl group is cyclopentadienyl, indenyl, tetrahydroindenyl, fluorenyl, octahydrofluorenyl, etc.; R' on the foregoing cyclopentadienyl groups each occurrence is hydrogen, methyl, ethyl, propyl, butyl, pentyl, hexyl, (including isomers), norbornyl, benzyl, phenyl, etc.; and X is chloro, bromo, iodo, methyl, ethyl, propyl, butyl, pentyl, hexyl, (including isomers), norbornyl, benzyl, phenyl, etc.

Specific compounds include, but are not limited to, (tert-butylamido)(tetramethyl-$\eta^5$-cyclopentadienyl)-1,2-ethanediylzirconium dimethyl, (tert-butylamido) (tetramethyl-$\eta^5$-cyclopentadienyl)-1,2-ethanediyltitanium dimethyl, (methylamido)(tetramethyl-$\eta^5$-cyclopentadienyl)-1,2-ethanediylzirconium dichloride, (methylamido)(tetramethyl-$\eta^5$-cyclopentadienyl)-1,2-ethane diyltitanium dichloride, (ethylamido)(tetramethyl-$\eta^5$-cyclopentadienyl)-methylenetitanium dichloro, (tertbutylamido)diphenyl (tetramethyl-$\eta^5$-cyclopentadienyl)-silane zirconium dibenzyl, (benzylamido)dimethyl-(tetramethyl-$\eta^5$-cyclopentadienyl)ilanetitaniumdichloride, and phenylphosphido) dimethyl(tetramethyl-$\eta^5$-cyclopentadienyl)silane zirconium dibenzyl.

Another suitable class of catalysts is substituted indenyl containing metal complexes as disclosed in U.S. Pat. No. 5,965,756 and No. 6,015,868. Other preferred catalysts are disclosed in U.S. Pat. No. 5,616,664 and copending applications: U.S. application Ser. No. 09/230,185; and Ser. No. 09/715,380, and U.S. Provisional Application Ser. No. 60/215,456; No. 60/170,175, and No. 60/393,862. These catalysts tend to have a higher molecular weight capability.

One class of the above catalysts is the indenyl containing metal wherein:

Formula IV

M is titanium, zirconium or hafnium in the +2, +3 or +4 formal oxidation state;

A' is a substituted indenyl group substituted in at least the 2 or 3 position with a group selected from hydrocarbyl, fluoro-substituted hydrocarbyl, hydrocarbyloxy-substituted hydrocarbyl, dialkylamino-substituted hydrocarbyl, silyl, germyl and mixtures thereof, the group containing up to 40 non-hydrogen atoms, and the A' further being covalently bonded to M by means of a divalent Z group; Z is a divalent moiety bound to both A' and M via σ-bonds, the Z comprising boron, or a member of Group 14 of the Periodic Table of the Elements, and also comprising nitrogen, phosphorus, sulfur or oxygen; X is an anionic or dianionic ligand group having up to 60 atoms exclusive of the class of ligands that are cyclic, delocalized, π-bound ligand groups; X' independently each occurrence is a neutral Lewis base, having up to 20 atoms; p is 0, 1 or 2, and is two less than the formal oxidation state of M, with the proviso that when X is a dianionic ligand group, p is 1; and q is 0, 1 or 2.

The above complexes may exist as isolated crystals optionally in pure form or as a mixture with other complexes, in the form of a solvated adduct, optionally in a solvent, especially an organic liquid, as well as in the form of a dimer or chelated derivative thereof, wherein the chelating agent is an organic material, preferably a neutral Lewis base, especially a trihydrocarbylamine, trihydrocarbylphosphine, or halogenated derivative thereof.

Preferred catalysts are complexes corresponding to the formula:

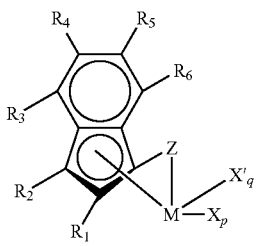

Formula V wherein $R_1$ and $R_2$ independently are groups selected from hydrogen, hydrocarbyl, perfluoro substituted hydrocarbyl, silyl, germyl and mixtures thereof, the group containing up to 20 non-hydrogen atoms, with the proviso that at least one of $R_1$ or $R_2$ is not hydrogen; $R_3$, $R_4$, $R_5$, and $R_6$ independently are groups selected from hydrogen, hydrocarbyl, perfluoro substituted hydrocarbyl, silyl, germyl and mixtures thereof, the group containing up to 20 non-hydrogen atoms; M is titanium, zirconium or hafnium; Z is a divalent moiety comprising boron, or a member of Group 14 of the Periodic Table of the Elements, and also comprising nitrogen, phosphorus, sulfur or oxygen, the moiety having up to 60 non-hydrogen atoms; p is 0, 1 or 2; q is zero or one; with the proviso that: when p is 2, q is zero, M is in the +4 formal oxidation state, and X is an anionic ligand selected from the group consisting of halide, hydrocarbyl, hydrocarbyloxy, di(hydrocarbyl)amido, di(hydrocarbyl)phosphido, hydrocarbyl sulfido, and silyl groups, as well as halo-, di(hydrocarbyl)amino-, hydrocarbyloxy- and di(hydrocarbyl)phosphino-substituted derivatives thereof, the X group having up to 20 non-hydrogen atoms, when p is 1, q is zero, M is in the +3 formal oxidation state, and X is a stabilizing anionic ligand group selected from the group consisting of allyl, 2-(N,N-dimethylaminomethyl)phenyl, and 2-(N,N-dimethyl)-aminobenzyl, or M is in the +4 formal oxidation state, and X is a divalent derivative of a conjugated diene, M and X together forming a metallocyclopentene group, and when p is 0, q is 1, M is in the +2 formal oxidation state, and X' is a neutral, conjugated or non-conjugated diene, optionally substituted with one or more hydrocarbyl groups, the X' having up to 40 carbon atoms and forming a π-complex with M.

More preferred catalysts are complexes corresponding to the formula:

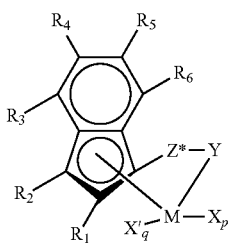

Formula VI wherein: $R_1$ and $R_2$ are hydrogen or $C_{1-6}$ alkyl, with the proviso that at least one of $R_1$ or $R_2$ is not hydrogen; $R_3$, $R_4$, $R_5$, and $R_6$ independently are hydrogen or $C_{1-6}$ alkyl; M is titanium; Y is —O—, —S—, —NR*—, —PR*—; Z* is SiR*$_2$, CR*$_2$, SiR*$_2$SiR*$_2$, CR*$_2$CR*$_2$, CR*=CR*, CR*$_2$SiR*$_2$, or GeR*$_2$; R* each occurrence is independently hydrogen, or a member selected from hydrocarbyl, hydrocarbyloxy, silyl, halogenated alkyl, halogenated aryl, and combinations thereof, the R* having up to 20 non-hydrogen atoms, and optionally, two R* groups from Z (when R* is not hydrogen), or an R* group from Z and an R* group from Y form a ring system; p is 0, 1 or 2; q is zero or one; with the proviso that: when p is 2, q is zero, M is in the +4 formal oxidation state, and X is independently each occurrence methyl or benzyl, when p is 1, q is zero, M is in the +3 formal oxidation state, and X is 2-(N,N-dimethyl)aminobenzyl; or M is in the +4 formal oxidation state and X is 1,4-butadienyl, and when p is 0, q is 1, M is in the +2 formal oxidation state, and X' is 1,4-diphenyl-1,3-butadiene or 1,3-pentadiene. The latter diene is illustrative of unsymmetrical diene groups that result in production of metal complexes that are actually mixtures of the respective geometrical isomers.

Other catalysts, cocatalysts, catalyst systems, and activating techniques which may be used in the practice of the invention disclosed herein may include those disclosed in; WO 96/23010, published on Aug. 1, 1996, WO 99/14250, published Mar. 25, 1999, WO 98/41529, published Sep. 24, 1998, WO 97/42241, published Nov. 13, 1997, WO 97/42241, published Nov. 13, 1997, those disclosed by Scollard, et al., in J. Am. Chem. Soc 1996, 118, 10008-10009, EP 0 468 537 B1, published Nov. 13, 1996, WO 97/22635, published Jun. 26, 1997, EP 0 949 278 A2, published Oct. 13, 1999; EP 0 949 279 A2, published Oct. 13, 1999; EP 1 063 244 A2, published Dec. 27, 2000; U.S. Pat. No. 5,408,017; U.S. Pat. No. 5,767,208; U.S. Pat. No. 5,907,021; WO 88/05792, published Aug. 11, 1988; WO88/05793, published Aug. 11, 1988; WO 93/25590, published Dec. 23, 1993;U.S. Pat. No. 5,599,761; U.S. Pat. No. 5,218,071; WO 90/07526, published Jul. 12, 1990; U.S. Pat. No. 5,972,822; U.S. Pat. No. 6,074,977; U.S. Pat. No. 6,013,819; U.S. Pat. No. 5,296,433; U.S. Pat. No. 4,874,880; U.S. Pat. No. 5,198,401; U.S. Pat. No. 5,621,127; U.S. Pat. No. 5,703,257; U.S. Pat. No. 5,728,855; U.S. Pat. No. 5,731,253; U.S. Pat. No. 5,710,224; U.S. Pat. No. 5,883,204; U.S. Pat. No. 5,504,049; U.S. Pat. No. 5,962,714; U.S. Pat. No. 5,965,677; U.S. Pat. No. 5,427,991; WO 93/21238, published Oct. 28, 1993; WO 94/03506, published Feb. 17, 1994; WO 93/21242, published Oct. 28, 1993; WO 94/00500, published Jan. 6, 1994, WO 96/00244, published Jan. 4, 1996, WO 98/50392, published Nov. 12, 1998; Wang, et al., Organometallics 1998, 17, 3149-3151; Younkin, et al., Science 2000, 287, 460-462, Chen and Marks, Chem. Rev. 2000, 100, 1391-1434, Alt and Koppl, Chem. Rev. 2000, 100, 1205-1221; Resconi, et al., Chem. Rev. 2000, 100, 1253-1345; Ittel, et al., ChemRev. 2000, 100, 1169-1203; Coates, Chem. Rev., 2000, 100, 1223-1251; and WO 96/13530, published May 9, 1996. Also useful are those catalysts, cocatalysts, and catalyst systems disclosed in U.S. Ser. No. 09/230,185, filed Jan. 15, 1999; U.S. Pat. No. 5,965,756; U.S. Pet. No. 6,150,297; and U.S. Ser. No. 09/715,380, filed Nov. 17, 2000. In addition, methods for preparing the aforementioned catalysts are described, for example, in U.S. Pat. No. 6,015,868.

The above-described catalysts may be rendered catalytically active by combination with an activating cocatalyst or by use of an activating technique. Suitable activating cocatalysts for use herein include, but are not limited to, polymeric or oligomeric alumoxanes, especially methylalumoxane, triisobutyl aluminum modified methylalumoxane, or isobutylalumoxane; neutral Lewis acids, such as $C_{1-30}$ hydrocarbyl substituted Group 13 compounds, especially tri(hydrocarbyl)

aluminum- or tri(hydrocarbyl)boron compounds and halogenated (including perhalogenated) derivatives thereof, having from 1 to 30 carbons in each hydrocarbyl or halogenated hydrocarbyl group, more especially perfluorinated tri(aryl) boron and perfluorinated tri(aryl)aluminum compounds, mixtures of fluoro-substituted(aryl)boron compounds with alkyl-containing aluminum compounds, especially mixtures of tris(pentafluorophenyl)borane with trialkylaluminum or mixtures of tris(pentafluorophenyl)borane with alkylalumoxanes, more especially mixtures of tris(pentafluorophenyl)borane with methylalumoxane and mixtures of tris(pentafluorophenyl)borone with methylalumoxane modified with a percentage of higher alkyl groups (MMAO), and most especially tris(pentafluorophenyl)borane and tris(pentafluorophenyl)aluminum; non-polymeric, compatible, non-coordinating, ion forming compounds (including the use of such compounds under oxidizing conditions), especially the use of ammonium-, phosphonium-, oxonium-, carbonium-, sylium- or sulfonium-salts of compatible, non-coordinating anions, or ferrocenium salts of compatible, non-coordinating anions; bulk electrolysis and combinations of the foregoing activating cocatalysts and techniques. The foregoing activating cocatalysts and activating techniques have been previously taught with respect to different metal complexes in the following references: EP-A-277,003, U.S. Pat. No. 5,153, 157, U.S. Pat. No. 5,064,802, EP-A-468,651 (equivalent to U.S. Ser. No. 07/547,718), EP-A-520,732 (equivalent to U.S. Ser. No. 07/876,268), and EP-A-520,732 (equivalent to U.S. Ser. No. 07/884,966 filed May 1, 1992).

Combinations of neutral Lewis acids, especially the combination of a trialkyl aluminum compound having from 1 to 4 carbons in each alkyl group and a halogenated tri(hydrocarbyl)boron compound having from 1 to 20 carbons in each hydrocarbyl group, especially tris(pentafluorophenyl)borane, further combinations of such neutral Lewis acid mixtures with a polymeric or oligomeric alumoxane, and combinations of a single neutral Lewis acid, especially tris (pentafluorophenyl)borane with a polymeric or oligomeric alumoxane are especially desirable activating cocatalysts. It has been observed that the most efficient catalyst activation using such a combination of tris(pentafluoro-phenyl)borane/alumoxane mixture occurs at reduced levels of alumoxane. Preferred molar ratios of Group 4 metal complex:tris(pentafluoro-phenylborane:alumoxane are from 1:1:1 to 1:5:10, more preferably from 1:1:1 to 1:3:5. Such efficient use of lower levels of alumoxane allows for the production of olefin polymers with high catalytic efficiencies using less of the expensive alumoxane cocatalyst. Additionally, polymers with lower levels of aluminum residue, and hence greater clarity, are obtained.

Suitable ion forming compounds useful as cocatalysts in some embodiments of the invention comprise a cation which is a Bronsted acid capable of donating a proton, and a compatible, non-coordinating anion, $A^-$. As used herein, the term "non-coordinating" means an anion or substance which either does not coordinate to the Group 4 metal containing precursor complex and the catalytic derivative derived therefrom, or which is only weakly coordinated to such complexes thereby remaining sufficiently labile to be displaced by a neutral Lewis base. A non-coordinating anion specifically refers to an anion which, when functioning as a charge balancing anion in a cationic metal complex, does not transfer an anionic substituent or fragment thereof to the cation thereby forming neutral complexes during the time which would substantially interfere with the intended use of the cationic metal complex as a catalyst. "Compatible anions" are anions which are not degraded to neutrality when the initially formed complex decomposes and are non-interfering with desired subsequent polymerization or other uses of the complex.

Preferred anions are those containing a single coordination complex comprising a charge-bearing metal or metalloid core which anion is capable of balancing the charge of the active catalyst species (the metal cation) which may be formed when the two components are combined. Also, the anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, known in the art and many, particularly such compounds containing a single boron atom in the anion portion, are available commercially.

Preferably such cocatalysts may be represented by the following general formula:

$(L^*-H)_d^+(A)^{d-}$           Formula VII wherein $L^*$ is a neutral Lewis base; $(L^*-H)+$ is a Bronsted acid; $A^{d-}$ is an anion having a charge of d−, and d is an integer from 1 to 3. More preferably $A^{d-}$ corresponds to the formula: $[M'Q_4]^-$, wherein M' is boron or aluminum in the +3 formal oxidation state; and Q independently each occurrence is selected from hydride, dialkylamido, halide, hydrocarbyl, hydrocarbyloxide, halosubstituted-hydrocarbyl, halosubstituted hydrocarbyloxy, and halosubstituted silylhydrocarbyl radicals (including perhalogenated hydrocarbyl-perhalogenated hydrocarbyloxy- and perhalogenated silylhydrocarbyl radicals), the Q having up to 20 carbons with the proviso that in not more than one occurrence is Q halide. Examples of suitable hydrocarbyloxide Q groups are disclosed in U.S. Pat. No. 5,296,433.

In a more preferred embodiment, d is one, that is, the counter ion has a single negative charge and is $A^-$. Activating cocatalysts comprising boron which are particularly useful in the preparation of catalysts of this invention may be represented by the following general formula:

$(L^*-H)^+(M'Q_4)^-$;           Formula VIII wherein $L^*$ is as previously defined; M' is boron or aluminum in a formal oxidation state of 3; and Q is a hydrocarbyl-, hydrocarbyloxy-, fluorinated hydrocarbyl-, fluorinated hydrocarbyloxy-, or fluorinated silylhydrocarbyl-group of up to 20 non-hydrogen atoms, with the proviso that in not more than one occasion is Q hydrocarbyl. Most preferably, Q in each occurrence is a fluorinated aryl group, especially a pentafluorophenyl group. Preferred $(L^*-H)^+$ cations are N,N-dimethylanilinium, N,N-di(octadecyl)anilinium, di(octadecyl)methylammonium, methylbis(hydrogenated tallowyl) ammonium, and tributylammonium.

Illustrative, but not limiting, examples of boron compounds which may be used as an activating cocatalyst are tri-substituted ammonium salts such as: trimethylammonium tetrakis(pentafluorophenyl)borate; triethylammonium tetrakis(pentafluorophenyl)borate; tripropylammonium tetrakis (pentafluorophenyl)borate; tri(n-butyl)ammonium tetrakis (pentafluorophenyl)borate; tri(sec-butyl)ammonium tetrakis (pentafluorophenyl)borate; N,N-dimethylanilinium tetrakis (pentafluorophenyl)borate; N,N-dimethylanilinium n-butyltris(pentafluorophenyl)borate; N,N-dimethylanilinium benzyltris(pentafluorophenyl)borate; N,N-dimethylanilinium tetrakis(4-(t-butyldimethylsilyl)-2,3,5,6-tetrafluorophenyl)borate; N,N-dimethylanilinium tetrakis(4-(triisopropylsilyl)-2,3,5,6-tetrafluorophenyl)borate; N,N- dimethylanilinium pentafluoro phenoxytris(pentafluorophenyl)borate; N,N-diethylanilinium tetrakis(pentafluorophenyl)borate; N,N-dimethyl-2,4,6-trimethylanilinium tetrakis(pentafluorophenyl)borate; trimethylammonium tetrakis(2,3,4,6-tetrafluorophenyl)borate; triethylammonium tetrakis(2,3,4,6-tetrafluorophenyl)borate; tripropylammonium tetrakis(2,3,4,6-tetrafluorophenyl)borate; tri(n-butyl)ammonium tetrakis(2,3,4,6-tetrafluorophenyl)borate, dimethyl(t-butyl)ammonium tetrakis(2,3,4,6-tetra fluorophenyl)borate; N,N-dimethylanilinium tetrakis(2,3,4,6-tetrafluorophenyl)borate; N,N-diethylanilinium tetrakis(2,3,4,6-tetrafluorophenyl)borate; and N,N-dimethyl-2,4,6-trimethylanilinium tetrakis(2,3,4,6-tetrafluorophenyl)borate; dialkyl ammonium salts such as: di-(i-propyl)ammonium tetrakis(pentafluorophenyl) borate, and dicyclohexylammonium tetrakis(pentafluorophenyl)borate; tri-substituted phosphonium salts such as: triphenylphosphonium tetrakis(pentafluorophenyl)borate, tri(o-tolyl)phosphonium tetrakis(pentafluorophenyl)borate, and tri(2,6-dimethylphenyl)phosphonium tetrakis(pentafluorophenyl)borate; di-substituted oxonium salts such as: diphenyloxonium tetrakis(pentafluorophenyl)borate, di(o-tolyl)oxonium tetrakis(pentafluorophenyl)borate, and di(2,6-dimethylphenyl)oxonium tetrakis(pentafluorophenyl)borate; di-substituted sulfonium salts such as: diphenylsulfonium tetrakis(pentafluorophenyl)borate, di(o-tolyl)sulfonium tetrakis(pentafluorophenyl)borate, and bis(2,6-dimethylphenyl)sulfonium tetrakis(pentafluorophenyl)borate.

Preferred silylium salt activating cocatalysts include, but are not limited to, trimethylsilylium tetrakispentafluorophenylborate, triethylsilylium tetrakispentafluorophenylborate and ether substituted adducts thereof. Silylium salts have been previously generically disclosed in J. Chem. Soc. Chem. Comm., 1993, 383-384, as well as Lambert, J. B., et al., Organometallics, 1994, 13, 2430-2443. The use of the above silylium salts as activating cocatalysts for addition polymerization catalysts is disclosed in U.S. Pat. No. 5,625,087. Certain complexes of alcohols, mercaptans, silanols, and oximes with tris(pentafluorophenyl)borane are also effective catalyst activators and may be used in embodiments of the invention. Such cocatalysts are disclosed in U.S. Pat. No. 5,296,433.

The catalyst system may be prepared as a homogeneous catalyst by addition of the requisite components to a solvent in which polymerization will be carried out by solution polymerization procedures. The catalyst system may also be prepared and employed as a heterogeneous catalyst by adsorbing the requisite components on a catalyst support material such as silica gel, alumina or other suitable inorganic support material. When prepared in heterogeneous or supported form, it is preferred to use silica as the support material.

At all times, the individual ingredients, as well as the catalyst components, should be protected from oxygen and moisture. Therefore, the catalyst components and catalysts should be prepared and recovered in an oxygen and moisture free atmosphere. Preferably, therefore, the reactions are performed in the presence of a dry, inert gas such as, for example, nitrogen or argon.

The molar ratio of metal complex: activating cocatalyst employed preferably ranges from 1:1000 to 2:1, more preferably from 1:5 to 1.5:1, most preferably from 1:2 to 1:1. In the preferred case in which a metal complex is activated by trispentafluorophenylborane and triisobutylaluminum modified methylalumoxane, the titanium:boron:aluminum molar ratio is typically from 1:10:50 to 1:0.5:0.1, most typically from about 1:3:5.

In general, the polymerization may be accomplished at conditions for Ziegler-Natta or metallocene-type polymerization reactions, that is, reactor pressures ranging from atmospheric to 3500 atmospheres (34.5 kPa). The reactor temperature should be greater than 80° C., typically from 100° C. to 250° C., and preferably from 100° C. to 150° C., with higher reactor temperatures, that is, reactor temperatures greater than 100° C. generally favoring the formation of lower molecular weight polymers.

In one embodiment of the process used to prepare the liquid low molecular weight polymers, no hydrogen is used in the reactor. It is also a feature of this process that the comonomer feed to the reactor be sufficient to produce a comonomer incorporation in the final polymer greater than 15, preferably greater than 30, more preferably greater than 40 and even more preferably greater than 50 mol %.

Generally the polymerization process is carried out with a differential pressure of ethylene of from 10 to 1000 psi (70 to 7000 kPa), most preferably from 40 to 60 psi (300 to 400 kPa). The polymerization is generally conducted at a temperature of from 80 to 250° C., preferably from 90 to 170° C., and most preferably from greater than 95 to 140° C.

In most polymerization reactions the molar ratio of catalyst:polymerizable compounds employed is from $10^{-12}$:1 to $10^{-1}$:1, more preferably from $10^{-9}$:1 to $10^{-5}$:1.

Solution polymerization conditions utilize a solvent for the respective components of the reaction. Preferred solvents include mineral oils and the various hydrocarbons which are liquid at reaction temperatures. Illustrative examples of useful solvents include alkanes such as pentane, isopentane, hexane, heptane, octane and nonane, as well as mixtures of alkanes including kerosene and Isopar E™, available from Exxon Chemicals Inc.; cycloalkanes such as cyclopentane and cyclohexane; and aromatics such as benzene, toluene, xylenes, ethylbenzene and diethylbenzene.

The solvent will be present in an amount sufficient to prevent phase separation in the reactor. As the solvent functions to absorb heat, less solvent leads to a less adiabatic reactor. The solvent:ethylene ratio (weight basis) will typically be from 2.5:1 to 12:1, beyond which point catalyst efficiency suffers. The most typical solvent:ethylene ratio (weight basis) is in the range of from 5:1 to 10:1.

The polymerization may be carried out as a batchwise or a continuous polymerization process, with continuous solution polymerizations processes being most preferred for the preparation of the low molecular weight polymers of the invention. In a continuous process, ethylene, comonomer, and optionally solvent and diene are continuously supplied to the reaction zone and polymer product continuously removed therefrom.

The homogeneous low molecular weight ethylene/alpha olefin polymers of the invention may be polymerized in a first reactor, with a second polymer (of higher molecular weight and/or of different density, and/or which is heterogeneous) being polymerized in a second reactor which is connected in series or in parallel to that in which the low molecular weight polymer is produced, to prepare in-reactor polymer blends having desirable properties. An example of a dual reactor process which may be adapted in accordance with the teachings of this disclosure to prepare blends wherein at least one component is the homogeneous liquid or gel-like low molecular weight ethylene/alpha-olefin polymer of this invention, is disclosed in WO 94/00500, (equivalent to U.S. Ser. No. 07/904,770), as well as U.S. Ser. No. 08/10958, filed Jan. 29, 1993.

The homogeneous low molecular weight ethylene/alpha olefin polymers disclosed herein may be used to make lubricants or be used as oil additives. The polymers disclosed herein can be used to replace one of more components of the lubricants or oil compositions disclosed in the following U.S. Pat. No. 6,310,164 entitled "Unsaturated copolymers, processes for preparing the same, and compositions containing the same;" U.S. Pat. No. 6,110,880 entitled "Polyolefin block copolymer viscosity modifier;" U.S. Pat. No. 6,100,224 entitled "Copolymers of ethylene alpha-olefin macromers and dicarboxylic monomers and derivatives thereof, useful as additives in lubricating oils and in fuels;" U.S. Pat. No. 6,084,046 entitled "Copolymer and copolymer composition;" U.S. Pat. No. 6,030,930 entitled "Polymers derived from ethylene and 1-butene for use in the preparation of lubricant disperant additives;" U.S. Pat. No. 6,017,859 entitled "Polymers derived from olefins useful as lubricant and fuel oil additives, processes for preparation of such polymers and additives and use thereof;" U.S. Pat. No. 5,912,212 entitled "Lubricating oil composition;" U.S. Pat. No. 5,811,379 entitled "Polymers derived from olefins useful as lubricant and fuel oil additives, processes for preparation of such polymers and additives and use thereof (PT-1267);" U.S. Pat. No. 5,759,967 entitled "Ethylene alpha-olefin/diene interpolymer-substituted carboxylic acid dispersant additives;" U.S. Pat. No. 5,747,596 entitled "Gel-free alpha-olefin dispersant additives useful in oleaginous compositions;" U.S. Pat. No. 5,717,039 entitled "Functionalization of polymers based on Koch chemistry and derivatives thereof;" U.S. Pat. No. 5,663,129 entitled "Gel-free ethylene interpolymer dispersant additives useful in oleaginous compositions;" U.S. Pat. No. 5,658,865 entitled "Oxidation-inhibitive lubricating oil composition;" U.S. Pat. No. 5,366,647 entitled "Derivatized ethylene alpha-olefin polymer useful as multifunctional viscosity index improver additive for oleaginous composition (PT-796);" U.S. Pat. No. 5,294,234 entitled "Fuel compositions of novel ethylene alpha-olefin polymers substituted amine dispersant additives;" U.S. Pat. No. 5,277,833 entitled "Ethylene alpha-olefin polymer substituted mono-and dicarboxylic acid lubricant dispersant additives;" U.S. Pat. No. 5,275,747 entitled "Derivatized ethylene alpha-olefin polymer useful as multifunctional viscosity index improver additive for oleaginous composition;" U.S. Pat. No. 5,229,022 entitled "Ethylene alpha-olefin polymer substituted mono- and dicarboxylic acid dispersant additives (PT-920);" and U.S. Pat. No. 5,017,299 entitled "Novel ethylene alpha-olefin copolymer substituted Mannich base lubricant dispersant additives."

A variety of lubricant compositions or lubricating oils can be formulated using the homogeneous low molecular weight ethylene/alpha olefin polymers disclosed herein. For example, a lubricating oil composition can comprise the homogeneous low molecular weight ethylene/alpha olefin polymers disclosed herein and a lubricating oil additive. When the homogeneous low molecular weight ethylene/alpha olefin polymer is used as a lubricating base oil and blended with at least one additive, such as an extreme pressure agent, an abrasion resistance agent, an oiliness improver and a detergent-dispersant, a lubricating oil composition having excellent properties can be obtained.

In addition, another lubricating oil composition can comprise: (1) a base oil comprising a mineral oil and/or a hydrocarbon synthetic oil, and (2) a homogeneous low molecular weight ethylene/alpha olefin polymer of the present invention and has an intrinsic viscosity [η], as measured in decalin at 135° C., of 0.1 to 5.0 dl/g or a kinematic viscosity at 100° C. of 4 to 200 centistokes; and optionally (3) a lubricating oil additive.

A viscosity index improver can be formulated according to embodiments of the invention. It comprises the same homogeneous low molecular weight ethylene/alpha olefin polymers employable in the lubricating oil composition. Similarly, a lubricating oil compatibility improver can be formulated according to embodiments of the invention. It comprises the same homogeneous low molecular weight ethylene/alpha olefin polymer as employable in the third lubricating oil composition.

A fuel oil composition can also be prepared according to embodiments of the invention comprises: (1) a middle fraction fuel oil having a boiling point of 150 to 400° C., and (2) a fuel oil fluidity improver comprising the homogeneous low molecular weight ethylene/alpha olefin polymers.

The lubricating oil additive for use in embodiments of the invention is at least one additive selected from an extreme pressure agent, an abrasion resistance agent, an oiliness improver and a detergent-dispersant.

Examples of the extreme pressure agents include sulfur type extreme pressure agents, such as sulfides, sulfoxides, sulfones, thiophosphinates, thiocarbonates, fats and oils, sulfurized fats and oils, and olefin sulfides; phosphoric acids, such as phosphoric esters, phosphorous esters, phosphoric ester amines and phosphorous ester amines; and halogen compounds, such as chlorinated hydrocarbons.

Examples of the abrasion resistance agent include inorganic or organic molybdenum compounds, such as molybdenum disulfide; organoboron compounds, such as alkylmercaptyl borate; graphite; antimony sulfide; boron compounds; and polytetrafluoroethylene.

Examples of the oiliness improvers include higher fatty acids, such as oleic acid and stearic acid; higher alcohols, such as oleyl alcohol; amines; esters; sulfurized fats and oils; and chlorinated fats and oils.

Examples of the detergent-dispersants include metallic sulfonates, such as calcium sulfonate, magnesium sulfonate and barium sulfonate; thiophosphonates; phenates; salicylates; succinimides; benzylamine; and succinates.

The lubricating oil composition may further contain a viscosity index improver, an antioxidant, an anti-corrosion agent and an anti-foaming agent.

As the viscosity index improvers, those generally added to lubricating oils are available, and examples thereof include natural resins, such as mineral oil, and synthetic resins, such as ethylene/alpha-olefin copolymer, alpha-olefin homopolymer, styrene/butadiene copolymer, poly(meth)acrylate and naphthalene condensate. Examples of the antioxidants include amine compounds, such as 2,6-di-t-butyl-4-methylphenol; and sulfur or phosphorus compounds, such as zinc dithiophosphate.

Examples of the anti-corrosion agents include carboxylic acids and their salts, such as oxalic acid; sulfonates; esters; alcohols; phosphoric acid and its salts; benzotriazole and its derivatives; and thiazole compounds.

Examples of the anti-foaming agents include silicone compounds, such as dimethylsiloxane and silica gel dispersion; alcohol compounds; and ester compounds. Though the amount of the lubricating oil additive used varies depending on the lubricating properties requested, it is in the range of usually 0.01 to 80 parts by weight, preferably 0.05 to 60 parts by weight, based on 100 parts by weight of the homogeneous low molecular weight ethylene/alpha olefin polymer.

The lubricating oil composition may further contain a mineral oil or a hydrocarbon synthetic oil in an amount of up to 50% by weight.

Since the lubricating oil composition contains the homogeneous low molecular weight ethylene/alpha olefin polymer as a base oil, the composition is excellent in compatibility with additives as well as in viscosity properties, heat stability, oxidation stability and abrasion resistance.

The base oil optionally used in the lubricating oil composition is a lubricating base oil comprising a mineral oil and/or a hydrocarbon synthetic oil. These oils can be used alone or as a mixture of two or more kinds without specific limitation, as long as they have a viscosity at 100° C. of 1.5 to 40.0 mm$^2$/S, preferably 2.0 to 10.0 mm$^2$/S. The mineral oil has a viscosity in the above range.

The mineral oil is, for example, a refined oil obtained by subjecting a paraffin base crude oil or an intermediate base crude oil to atmospheric distillation or subjecting a residual oil of the atmospheric distillation to vacuum distillation and then refining the resulting distillate oil in a conventional manner, or a deep-dewaxed oil obtained by deep-dewaxing the refined oil obtained above. Examples of the refining methods include hydrogenation, dewaxing, solvent extraction, alkali distillation, sulfuric acid washing and clay treatment. These methods can be carried out singly or in appropriate combination, or the same method can be repeated plural times. In these cases, there is no specific limitation on the order of the methods and the number of repetition times. In the present invention, it is particularly preferable to use a mineral oil obtained by a solvent dewaxing process that is made under severe conditions or obtained by a deep-dewaxing process such as a catalytic hydrogenation dewaxing process using a zeolite catalyst.

Examples of the hydrocarbon synthetic oils preferably used include oligomers obtained by polymerizing or copolymerizing olefins of 2 to 20 carbon atoms or arbitrary mixtures of these olefins, such as an oligomer of 1-octene, an oligomer of 1-decene and an oligomer of 1-dodecene. In addition to the mineral oil and/or the hydrocarbon synthetic oil, also available are diesters, such as di-2-ethylhexyl sebacate, dioctyl adipate and dioctyl dodecanoate, and polyol esters, such as pentaerythritol tetraoleate and trimethylolpropane tripelargonate. The oligomers are obtained by (co)polymerizing olefins of 2 to 20 carbon atoms by any processes.

Additive concentrates and lubricating oil compositions disclosed herein may contain other additives. The use of such additives is optional and the presence thereof in the compositions will depend on the particular use and level of performance required. Thus the other additive may be included or excluded. Additive concentrates typically comprise from about 0.1% to about 30% by weight of homogeneous low molecular weight ethylene/alpha olefin polymer and from about 70% to about 99.9% by weight of a substantially, inert, normally liquid, organic diluent.

Lubricating oil compositions often comprise zinc salts of a dithiophosphoric 15 acid, often referred to as zinc dithiophosphates, zinc 0,0-dihydrocarbyl dithiophosphates, and other commonly used names. They are sometimes referred to by the abbreviation 2DP. One or more zinc salts of dithiophosphoric acids may be present in a minor amount to provide additional extreme pressure, anti-wear and anti-oxidancy performance.

Other additives that may optionally be used in the lubricating oils of this invention include, for example, detergents, dispersants, supplemental viscosity improvers, oxidation inhibiting agents, corrosion inhibiting agents, pour point depressing agents, extreme pressure agents, anti-wear agents, color stabilizers, friction modifiers, and anti-foam agents. Extreme pressure agents and corrosion and oxidation inhibiting agents which may be included in the compositions of the invention are exemplified by chlorinated aliphatic hydrocarbons, organic sulfides and polysulfides, phosphorus esters including dihydrocarbon and trihydrocarbon phosphites, and molybdenum compounds.

Other oxidation inhibiting agents include materials such as alkylated diphenyl amines, hindered phenols, especially those having tertiary alkyl groups such as tertiary butyl groups in the position ortho to the phenolic —OH group, and others. Such materials are well known to those of skill in the art.

Anti-foam agents used to reduce or prevent the formation of stable foam include silicones or organic polymers. Examples of these and additional anti-foam compositions are described in "Foam Control Agents", by Henry T. Kemer (Noyes Data Corporation, 1976), pages 125-162.

Detergents and dispersants may be of the ash-producing or ashless type. The ash-producing detergents are exemplified by oil soluble neutral and basic salts of alkali or alkaline earth metals with sulfonic acids, carboxylic acids, phenols or organic phosphorus acids characterized by a least one direct carbon-to-phosphorus linkage.

The above-illustrated other additives may each be present in lubricating compositions at a concentration of as little as 0.001% by weight, usually ranging from about 0.01% to about 20% by weight. In most instances, they each contribute from about 0.1% to about 10% by weight, more often up to about 5% by weight.

The various additive-compositions of this invention described herein can be added directly to the oil of lubricating viscosity. Preferably, however, they are diluted with a substantially inert, normally liquid organic diluent such as mineral oil, a synthetic oil such as a polyalphaolefin, naphtha, benzene, toluene or xylene, to form an additive concentrate. These concentrates usually comprise about 0.1 to about 30% by weight, frequently from about 1% to about 20% by weight, more often from about 5% to about 15% by weight, of the interpolymers of this invention and may contain, in addition, one or more other additives known in the art or described hereinabove. Additive concentrates are prepared by mixing together the desired components, often at elevated temperatures, usually less than 150° C., often no more than about 130° C., frequently no more than about 115° C.

The lubricating compositions of this invention employ an oil of lubricating viscosity, including natural or synthetic lubricating oils and mixtures thereof. Mixture of mineral oil and synthetic oils, particularly polyalphaolefin oils and polyester oils are often used. Natural oils include animal oils and vegetable oils (for example castor oil, lard oil and other vegetable acid esters) as well as mineral lubricating oils such as liquid petroleum oils and solvent-treated or acid treated mineral lubricating oils of the paraffinic, naphthenic or mixed paraffinic-naphthenic types. Hydrotreated or hydrocracked oils are included within the scope of useful oils of lubricating viscosity.

Oils of lubricating viscosity derived from coal or shale are also useful. Synthetic lubricating oils include hydrocarbon oils and halosubstituted hydrocarbon oils (such as polymerized and interpolymerized olefins etc. and mixtures thereof), alkylbenzenes, polyphenyl (for example, biphenyls, terphenyls, alkylated polyphenyls etc.), alkylated diphenyl ethers and alkylated diphenyl sulfides and their derivatives, and analogs and homologues thereof.

Alkylene oxide polymers and interpolymers and derivatives thereof, and those where terminal hydroxyl groups have been modified by esterification, esterification, etc., constitute other classes of known synthetic lubricating oils that can be used.

Another suitable class of synthetic lubricating oils that can be used comprises the esters of dicarboxylic acids and those made from $C_5$ to $C_{12}$ monocarboxylic acids and polyols or polyether polyols.

Other synthetic lubricating oils include liquid esters of phosphorus-containing acids, polymeric tetrahydrofurans, and alkylated diphenyloxides.

Unrefined, refined and re-refined oils, either natural or synthetic (as well as mixtures of two or more of any of these) of the type disclosed herein above can used in the compositions of the present invention.

Specific examples of the above-described oils of lubricating viscosity are given in Chamberlin III, U.S. Pat. No. 4,326,972 and European Patent Publication 107,282. A basic, brief description of lubricant base oils appears in an article by D. V. Brock, "Lubrication Engineering", Volume 43, pages 184-5, March, 1987.

Additives such as antioxidants (for example, hindered phenolics (for example, Irganox™ 1010, Irganox™ 1076), phosphites (for example, Irgafos™ 168)), antiblock additives, pigments, and fillers can also be included in the modified formulations, to the extent that they do not interfere with the desired formulation properties.

The skilled artisan will appreciate that the invention disclosed herein may be practiced in the absence of any component which has not been specifically disclosed. The following examples are provided as further illustration of the invention and are not to be construed as limiting. Unless stated to the contrary all parts and percentages are expressed on a weight basis.

EXAMPLES

Catalyst Preparation

1) Synthesis of dimethylsilyl(2-methyl-s-indacenyl) (t-butylamido)titanium 1,3-pentadiene (Catalyst 1)

Catalyst 1 can be synthesized according to Example 23 of U.S. Pat. No. 5,965,756.

2) Synthesis of (N-(1,1-dimethylethyl)-1,1-di-(4-n-butyl-phenyl)-1-((1,2,3,3a,7a-η)-3-(1,3-dihydro-2H-isoindol-2-yl)-1H-inden-1-yl)silanaminato-(2-)-N-dimethyltitanium (Catalyst 2)

(i) Preparation of (p-Bu-Ph)$_2$SiCl$_2$

To a three-necked 250 mL round-bottom flask under a nitrogen atmosphere equipped with a reflux condenser and a 250 mL dropping funnel 4.87 g of Mg turnings (0.200 moles) were introduced. 1-bromo-4-butyl benzene (42.62 g, 0.200 moles) and 80 mL of THF were then added to the dropping funnel. At this time 10 mL of the bromobenzene/THF solution was added to the Mg turnings with a small amount of ethyl bromide. The solution was then stirred until initiation occurred. The rest of the bromobenzene/THF solution was then added dropwise to allow refluxing to occur. After addition of the bromobenzene/THF solution, the mixture was heated at reflux until the magnesium was consumed.

The resulting Grignard solution was then transferred to a 250 mL dropping funnel which was attached to a three-necked 250 mL round-bottom flask under a nitrogen atmosphere equipped with a reflux condenser. To the round bottomed flask 100 mL of heptane was introduced followed by SiCl$_4$ (15.29 g, 0.090 moles). To this solution, the Grignard solution was added dropwise. After addition was complete the resulting mixture was refluxed for 2 h and then allowed to cool to room temperature. Under an inert atmosphere the solution was filtered. The remaining salts were further washed with heptane (3×40 mL), the washings were combined with the original heptane solution.

The heptane was then removed via distillation at atmospheric pressure. The resulting viscous oil was then vacuum distilled with collection of the product at 1 mm at 210° C. giving 19.3 g (58%). $^1$H(C$_6$D$_6$) δ: 0.80 (t, 6H), 1.19 (m, 4H), 1.39 (m, 4H), 2.35 (t, 4H), 7.0 (d, 4H), 7.7 (d, 4H).

(ii) Preparation of (p-Bu-Ph)$_2$SiCl)(NH-t-Bu)

Dichloro-di(p-butylpheny)silane (4.572 g, 12.51 mmol) was dissolved in 45 mL of methylene chloride. To this solution was added 1.83 g, 25.03 mmol of t-BuNH$_2$. After stirring overnight Solvent was removed under reduced pressure. The residue was extracted with 45 mL of hexane and filtered. Solvent was removed under reduced pressure leaving 4.852 g of product as an off-white oil. $^1$H(C$_6$D$_6$) δ: 0.75 (t, 6H), 1.15 (s, 9H), 1.2 (m, 4H), 1.4 (m, 4H), 1.51 (s, 1H), 2.4 (t, 4H), 7.05 (d, 4H), 7.8 (d, 4H).

(iii) Preparation of (p-Bu-Ph)$_2$Si(3-isoindolino-indenyl)(NH-t-Bu)

To 4.612 g (11.47 mmol) of (p-Bu-Ph)$_2$Si(Cl)(NH-t-Bu) dissolved in 20 mL of THF was added 2.744 g (8.37 mmol) of lithium 1-isoindolino-indenide dissolved in 30 mL of THP. After the reaction mixture was stirred overnight, solvent was removed under reduced pressure. The residue was extracted with 50 mL of hexane and filtered. Solvent removal gave 6.870 g of product as very viscous red-brown oil. Yield 91.0% $^1$H(C$_6$D$_6$) δ: 0.75 (m, 6H), 1.15 (s, 9H), 1.25 (m, 4H), 2.4 (m, 4H), 4.2 (s, 1H), 4.5 (dd, 4H), 5.6 (s, 1H) 6.9-7.7 (m, 16H).

(iv) Preparation of dilithium Salt of (p-Bu-Ph)$_2$Si(3-isoindolino-indenyl)(NH-t-Bu)

To a 50 mL of hexane solution containing 6.186 g (10.33 mmol) of (p-Bu-Ph)$_2$Si(3-isoindolino-indenyl)(NH-t-Bu) was added 13.5 mL of 1.6 M n-BuLi solution. A few minutes after n-BuLi addition a yellow precipitate appeared. After stirring overnight the yellow precipitate was collected on the frit, washed with 4×20 mL of hexane and dried under reduced pressure to give 4.4181 g of product as yellow powder. Yield 70.0%.

(v) Preparation of dichloro(N-1,1-dimethylethyl)-1,1-(4-butyl-phenyl)-1-((1,2,3,3a,7a-η)-3-(1,3-dihydro-2H-isoindol-2-yl)-1H-inden-1-yl)silanaminato-(2-)-N-)titanium In the drybox 2.620 g (7.1 mmol) of TiCl$_3$(THF)$_3$ was suspended in 40 mL of THF. To this solution 4.319 g (7.07 mmol) of dilithium salt of (p-Bu-Ph)$_2$Si(3-isoindolino-indenyl)(NH-t-Bu) dissolved in 60 mL of THF was added within 2 min. The solution was then stirred for 60 min. After this time 1.278 g of PbCl$_2$ (4.60 mmol) was added and the solution was stirred for 60 min. The THF was then removed under reduced pressure. The residue was extracted with 50 mL of toluene and filtered. Solvent was removed under reduced pressure leaving black crystalline solid. Hexane was added (35 mL) and the black suspension was stirred for 0.5 hr. Solid was collected on the frit, washed with 2×30 mL of hexane and dried under reduced pressure to give 4.6754 g of product as black-blue crystalline solid. Yield 92.4%. $^1$H (toluene-d$_8$) δ: 0.75 (m, 6H), 1.25 (m, 4H), 1.5 (m, 4H), 1.65 (s, 9H), 2.5 (t, 4H), 4.5 (d, 2H), 5.0 (d, 2H), 6.0 (s, 1H), 6.8-8.2 (m, 16H).

(vi) Preparation of (N-1,1-dimethylethyl)-1,1-(4-butyl-phenyl)-1-((1,2,3,3a,7a-η)-3-(1,3-dihydro-2H-isoindol-2-yl)-1H-inden-1-yl)silanaminato-(2-)-N-)-dimethyltitanium The dichloro(N-1,1-dimethylethyl)-1,1-(4-butyl-phenyl)-1-((1,2,3,3a,7a-η)-3-(1,3-dihydro-2H-isoindol-2-yl)-1H-inden-1-yl)silanaminato-(2-)-N-)titanium (1.608 g, 2.25 mmol) was suspended in 35 mL of toluene. To this solution was added 3 mL (4.75 mmol) of 1.6 M MeLi ether solution. Reaction color changed at once from dark green-black to dark red. After stirring for 1 hr solvent was removed under reduced pressure. The residue was extracted with 55 mL of hexane and filtered. Solvent was removed leaving 1.456 g of red solid. Yield 96%. $^1$H (toluene-d$_8$) δ: 0.3 (s, 3H), 0.8 (m, 6H), 1.05 (s, 3H), 1.25 (m, 4H), 1.5 (m, 4H), 1.75 (s, 9H), 2.5 (m, 4H), 4.5 (d, 2H), 4.8 (d, 2H), 5.7 (s, 1H), 6.7-8.3 (m, 16H).

3) Synthesis of (C$_5$Me$_4$SiMe$_2$N$^t$Bu)Ti(η$^4$-1,3-pentadiene) (Catalyst 3)

Catalyst 3 can be synthesized according to Example 17 of U.S. Pat. No. 5,556,928.

4) Synthesis of rac-[1,2-ethanediylbis(1-indenyl)] zirconium(1,4-diphenyl-1,3-butadiene) (Catalyst 4)

Catalyst 4 can be synthesized according to Example 11 of U.S. Pat. No. 5,616,664.

Synthesis of Armeenium Borate[methylbis(hydrogenatedtallowalkyl)ammonium tetrakis(pentafluoro phenyl)borate] (Cocatalyst 1)

Cocatalyst 1, Armeenium borate, can be prepared from ARMEEN® M2HT (available from Akzo-Nobel), HCl, and Li[B(C$_6$F$_5$)$_4$] according to Example 2 of U.S. Pat. No. 5,919,983.

EXAMPLES

Preparation of Examples 1-19 and Comparative Examples 1-8

The polymers were prepared in a 1 gallon, oil jacketed, Autoclave continuously stirred tank reactor (CSTR). A magnetically coupled agitator with Lightning A-320 impellers provided the mixing. The reactor ran liquid full at 475 psig (3,275 kPa). Process flow was in at the bottom and out of the top. A heat transfer oil was circulated through the jacket of the reactor to remove some of the heat of reaction. At the exit of the reactor was a micromotion flow meter that measured flow and solution density. All lines on the exit of the reactor were traced with 50 psi (344.7 kPa) steam and insulated.

ISOPAR-E solvent and comonomer were supplied to the reactor at 30 psig pressure. The solvent feed to the reactors was measured by a Micro-Motion™ mass flow meter. A variable speed diaphragm pump controlled the solvent flow rate and increased the solvent pressure to reactor pressure. The comonomer was metered by a Micro-Motion™ mass flow meter and flow controlled by a Research control valve. The 1-octene stream was mixed with the solvent stream at the suction of the solvent pump and is pumped to the reactor with the solvent. The remaining solvent was combined with ethylene and (optionally) hydrogen and delivered to the reactor. The ethylene stream was measured by a Micro-Motion™ mass flow meter just prior to the Research valve controlling flow. Three Brooks flow meter/controllers (1-200 sccm and 2-100 sccm) were used to deliver hydrogen into the ethylene stream at the outlet of the ethylene control valve.

The ethylene or ethylene/hydrogen mixture combined with the solvent/comonomer stream at ambient temperature. The temperature of the solvent/monomer as it enters the reactor was controlled with two heat exchangers. This stream enters the bottom of the 1 gallon CST reactor. The three component catalyst system and its solvent flush also enter the reactor at the bottom but through a different port than the monomer stream.

Polymerization was stopped with the addition of catalyst kill into the reactor product line after the meter measuring the solution density. Other polymer additives could be added with the catalyst kill. The reactor effluent stream then entered a post reactor heater that provides additional energy for the solvent removal flash. This flash occurs as the effluent exits the post reactor heater and the pressure is dropped from 475 psig down to 10 at the reactor pressure control valve. This flashed polymer entered a hot oil jacketed devolatilizer. Approximately 90% of the volatiles were removed from the polymer in the devolatilizer. The volatiles exit the top of the devolatilizer. The remaining stream is condensed and with a chilled water jacketed exchanger and then enters a glycol jacket solvent/ethylene separation vessel. Solvent is removed from the bottom of the vessel and ethylene vents from the top. The ethylene stream is measured with a Micro-Motion mass flow meter. This measurement of unreacted ethylene was used to calculate the ethylene conversion. The polymer separated in the devolatilizer and was pumped out with a gear pump. The product was collected in lined pans and dried in a vacuum oven at 140° C. for 24 hr.

Additives (for example, antioxidants, pigments, etc.) were incorporated into the interpolymer products and all polymers were stabilized with approximately 1000 ppm Irganox 1010 and 2000 ppm Irgafos 168. Both Irganox™ and Irgafos™ are made by and trademarks of Ciba Geigy Corporation. Irgafos™ 168 is a phosphite stabilizer and Irganox™ 1010 is a hindered polyphenol stabilizer (for example, tetrakis[methylene 3-(3,5-di t-butyl-4-hydroxyphenylpropionate)]-methane.

Table I summarizes the polymerization conditions. In Examples 1-16 and Comparative Examples 1-8 the comonomer was 1-octene; in Examples 17-19, the comonomer was propylene.

TABLE 1*

| Ex # | Reactor Temp ° C. | Solvent Flow lb/hr | Ethylene Flow lb/hr | Octene Flow lb/hr | Propylene Flow lb/hr | Hydrogen Flow sccm | C2 Conversion (%) | B*/Ti Molar Ratio | MMAO$^a$/ Ti Molar Ratio | Catalyst |
|---|---|---|---|---|---|---|---|---|---|---|
| Ex 1 | 135.0 | 15.0 | 0.94 | 10.77 | — | — | 85.7 | 1.22 | 2.0 | 1 |
| Ex 2 | 159.8 | 8.5 | 0.94 | 10.54 | — | — | 84.3 | 1.25 | 2.1 | 2 |
| Ex 3 | 110.1 | 17.7 | 0.94 | 7.99 | — | — | 85.2 | 1.22 | 2.0 | 1 |
| Ex 4 | 160.1 | 4.5 | 0.94 | 14.54 | — | — | 85.5 | 1.21 | 2.0 | 3 |
| Ex 5 | 159.9 | 8.8 | 2.24 | 8.96 | — | — | 84.3 | 1.21 | 2.0 | 1 |

TABLE 1*-continued

| Ex # | Reactor Temp °C. | Solvent Flow lb/hr | Ethylene Flow lb/hr | Octene Flow lb/hr | Propylene Flow lb/hr | Hydrogen Flow sccm | C2 Conversion (%) | B*/Ti Molar Ratio | MMAO$^a$/Ti Molar Ratio | Catalyst |
|---|---|---|---|---|---|---|---|---|---|---|
| Ex 6 | 160.2 | 3.2 | 0.86 | 15.93 | — | — | 93.1 | 1.18 | 2.0 | 4 |
| Ex 7 | 160.1 | 8.8 | 2.24 | 8.96 | — | — | 85.7 | 1.21 | 2.0 | 3 |
| Ex 8 | 135.1 | 9.0 | 2.27 | 15.39 | — | — | 85.0 | 1.20 | 4.9 | 4 |
| Ex 9 | 160.0 | 3.6 | 2.15 | 14.22 | — | — | 89.8 | 1.20 | 5.0 | 4 |
| Ex 10 | 135.0 | 9.6 | 0.89 | 16.17 | — | — | 91.9 | 1.18 | 5.1 | 4 |
| Ex 11 | 110.2 | 17.7 | 0.94 | 7.99 | — | — | 85.8 | 1.21 | 5.0 | 3 |
| Ex 12 | 135.1 | 17.7 | 2.25 | 6.75 | — | — | 85.3 | 1.20 | 5.0 | 3 |
| Ex 13 | 110.5 | 9.0 | 0.94 | 16.74 | — | — | 86.6 | 1.17 | 5.1 | 4 |
| Ex 14 | 135.4 | 16.8 | 0.94 | 8.94 | — | — | 86.9 | 1.21 | 5.0 | 2 |
| Ex 15 | 160.0 | 4.5 | 0.94 | 14.54 | — | — | 85.8 | 1.21 | 2.0 | 1 |
| Ex 16 | 134.7 | 15.0 | 0.94 | 10.77 | — | — | 85.4 | 1.21 | 5.0 | 3 |
| Ex 17 | 100.28 | 37.503 | 2.50 | — | 4.00 | 609.13 | 90.42 | 1.17 | 5.0 | 1 |
| Ex 18 | 100.77 | 37.527 | 2.50 | — | 4.00 | 1229.00 | 90.67 | 1.24 | 5.0 | 1 |
| Ex 19 | 131.13 | 38.223 | 2.29 | — | 3.20 | 1229.60 | 98.72 | 1.21 | 5.0 | 1 |
| Comp Ex 1 | 160.2 | 10.9 | 2.27 | 6.81 | — | — | 84.9 | 1.22 | 2.0 | 2 |
| Comp Ex 2 | 111.1 | 19.3 | 2.26 | 5.09 | — | — | 86.6 | 1.22 | 5.0 | 1 |
| Comp Ex 3 | 109.6 | 13.6 | 2.27 | 10.82 | — | — | 84.4 | 1.31 | 5.2 | 4 |
| Comp Ex 4 | 110.3 | 18.2 | 0.94 | 7.55 | — | — | 86.4 | 1.18 | 5.0 | 2 |
| Comp Ex 5 | 135.0 | 18.6 | 2.27 | 5.78 | — | — | 86.2 | 1.20 | 4.9 | 2 |
| Comp Ex 6 | 113.4 | 19.5 | 2.27 | 4.88 | — | — | 86.0 | 1.11 | 4.8 | 2 |
| Comp Ex 7 | 110.4 | 19.3 | 2.26 | 5.09 | — | — | 85.6 | 1.21 | 5.1 | 3 |
| Comp Ex 8 | 135.3 | 17.7 | 2.25 | 6.75 | — | — | 84.7 | 1.21 | 5.0 | 1 |

*The cocatalyst for all polymerisations was Armeenium Borate [methylbis(hydrogenatedtallowalkyl) ammonium tetrakis (pentafluoro phenyl) borate prepared as in U.S. Pat. No. 5,919,983, Ex. 2.
$^a$ a modified methylaluminoxane available from Akzo Nobel as MMAO-3A (CAS# 146905-79-10)

Table 2, summarizes the molecular weight, pour point, thermal behavior, comonomer incorporation, and viscosity data for the Examples. These viscosities are low, reaching a value of 3 cP at 177° C. for the lowest molecular weight material produced. The liquid low molecular weight polymers of the present invention provide an advantage over traditional polyethylenes of similar molecular weight in that, for a given molecular weight, the viscosity is substantially lower, thus providing for good mechanical integrity properties due to the higher molecular weight and improved processability and/or lower viscosity. In addition all examples exhibit low crystallinities, for instance, all are much lower than those disclosed in Examples 1-14 of U.S. Pat. No. 6,054,544. The melting points (Tm) and crystallization points (Tc) are shown in Table 2 along with the glass transition temperatures. The glass transition temperatures are low (less than −55° C.) providing for good low temperature properties of the examples on their own or in combination with another material. The pour points for these materials are generally low also (less than 50° C.), indicating the fluidity of the samples at room temperature and the potential to remain fluid at ambient conditions of surrounding air (25° C.) or freezing water (0° C.) or below (<0° C.).

TABLE 2

| Ex # | Mw | Mn | Mw/Mn | Comonomer (Mol %) | Pour Point (° C.) | Crystallinity (%) | ΔH (J/g) | Tm (° C.) |
|---|---|---|---|---|---|---|---|---|
| 1 | 14,600 | 6,510 | 2.24 | 67.8 | 3 | 1.0 | 2.797 | 66.28 |
| 2 | 13,700 | 5,350 | 2.56 | 53.6 | 3 | 0.2 | 0.647 | 69.76 |
| 3 | 32,700 | 14,700 | 2.22 | 62.7 | 39 | 0.4 | 1.23 | — |
| 4 | 3,960 | 1,600 | 2.48 | 66.1 | −18 | 0.2 | 0.6352 | — |
| 5 | 20,100 | 7,890 | 2.55 | 37.9 | 39 | 1.1 | 3.0716 | 60.43 |
| 6 | 930 | 340 | 2.74 | 44.1 | −57 | 1.2 | 3.4854 | 59.18 |
| 7 | 8,890 | 3,560 | 2.5 | 37.1 | 18 | 0.3 | 0.8378 | 68.23 |
| 8 | 14,500 | 5,410 | 2.68 | 19.7 | 42 | 9.0 | 26.37 | — |
| 9 | 4,220 | 860 | 4.91 | 25.9 | 6 | 5.7 | 16.78 | 64.8 |
| 10 | 3,580 | 970 | 3.69 | 49.8 | −24 | 2.6 | 7.524 | 60.11 |
| 11 | 12,200 | 5,830 | 2.09 | 64.1 | −6 | 0.6 | 1.719 | — |
| 12 | 16,100 | 6,100 | 2.64 | 30.8 | 39 | 0.6 | 1.858 | 58.45 |
| 13 | 11,000 | 4,500 | 2.44 | 44.0 | 12 | 0.2 | 0.5773 | 61.2 |
| 14 | 24,900 | 11,200 | 2.22 | 51.7 | 12 | 1.3 | 3.936 | 58.99 |
| 15 | 8,550 | 3,820 | 2.24 | 70.5 | 0 | 2.5 | 7.3 | 63.01 |
| 16 | 6,300 | 2,470 | 2.55 | 68.5 | −15 | 0.3 | 0.8944 | — |
| 17 | 10,000 | 3,980 | 2.51 | 44.2 | 45 | 1.85 | 5.407 | 66.46 |
| 18 | 4,690 | 2,040 | 2.3 | 44.7 | 9 | 1.39 | 4.066 | 59.68 |
| 19 | 2,980 | 1,240 | 2.4 | 44.6 | 12 | 1.94 | 5.668 | — |
| Comp Ex 1 | 32,700 | 15,200 | 2.15 | 24.4 | 111 | 5.4 | 15.87 | −7.23 |
| Comp Ex 2 | 97,400 | 42,800 | 2.28 | 26.6 | >180 | 7.0 | 20.42 | 66.76 |
| Comp Ex 3 | 26,400 | 13,300 | 1.98 | 15.3 | 78 | 13.6 | 39.75 | 20.61 |
| Comp Ex 4 | 54,100 | 26,300 | 2.06 | 51.8 | 90 | 2.3 | 6.86 | 60.49 |
| Comp Ex 5 | 95,000 | 45,000 | 2.11 | 20.3 | >180 | 11.1 | 32.52 | 26.13 |
| Comp Ex 6 | 226,900 | 103,800 | 2.19 | 19.0 | >180 | 9.6 | 27.99 | 2.74 |
| Comp Ex 7 | 39,300 | 16,200 | 2.43 | 27.4 | 153 | 0.6 | 1.71 | 60.93 |
| Comp Ex 8 | 38,400 | 16,300 | 2.36 | 31.0 | 153 | 3.4 | 9.936 | 58.57 |

TABLE 2-continued

| Ex # | Tc(° C.) | Tg (° C.) | Visc 60° C. (cP) | Visc 100° C. (cP) | Visc 125° C. (cP) | Visc 150° C. (cP) | Visc 177° C. (cP) |
|---|---|---|---|---|---|---|---|
| 1 | 57.68 | −64.61 | 9638 | 1743 | — | 427 | 246 |
| 2 | 62.97 | — | 12597 | 2265 | 1000 | 535 | 285 |
| 3 | 44.92 | −63.17 | — | 17246 | 7453 | 3845 | 2028 |
| 4 | 49.77 | −69.95 | 8233 | 1791 | 89.4 | 50.4 | 30.3 |
| 5 | 49.86 | −68.38 | >100000 | 12897 | 4936 | 2423 | 1286 |
| 6 | 48.49 | −72.86 | 379 | 129 | 7.73 | 4.84 | 3.4 |
| 7 | 61.36 | −70.5 | >100000 | 12377 | 518.6 | 280.4 | 157.4 |
| 8 | −20.60 | −68.3 | 82282 | 14097 | — | 3011 | 1596 |
| 9 | 55.61 | — | 11058 | 2594 | 127.7 | 75.3 | 45.4 |
| 10 | 44.56 | — | 5479 | 1272 | 66.4 | 38.2 | 23.5 |
| 11 | 47.33 | −68.07 | 5975 | 1152 | 535 | 289.8 | 167.9 |
| 12 | — | — | >100000 | 6899 | — | 1464 | 810 |
| 13 | 54.53 | — | >100000 | 16616 | 773.3 | 398.4 | 226.1 |
| 14 | 49.95 | −67.37 | 42991 | 7393 | — | 1676 | 936 |
| 15 | 51.4 | −66.68 | 3034 | 613 | — | 160 | 94 |
| 16 | 46.78 | −69.28 | 18146 | 3704 | 177.7 | 11 | 57.9 |
| 17 | 66.46 | −55.10 | — | — | — | — | — |
| 18 | 59.68 | −58.59 | >10000 | 916 | 361 | 198 | 117 |
| 19 | — | −61.75 | 2183 | 278 | 121 | 69 | 40 |
| Comp Ex 1 | −9.95 | −62.63 | — | >100000 | >100000 | >100000 | >100000 |
| Comp Ex 2 | 61.36 | −66.84 | — | >100000 | >100000 | >100000 | >100000 |
| Comp Ex 3 | 31.27 | −59.38 | — | >100,000 | 57288 | 28343 | 14877 |
| Comp Ex 4 | 50.20 | −68.94 | — | >100,000 | 37972 | 19376 | 10098 |
| Comp Ex 5 | 46.14 | −64.24 | — | >100,000 | >100000 | >100000 | >100000 |
| Comp Ex 6 | 45.15 | −59.06 | — | — | >100000 | >100000 | >100000 |
| Comp Ex 7 | 49.71 | −66.13 | — | — | >100000 | 63586 | 30893 |
| Comp Ex 8 | 48.37 | −68.62 | — | >100000 | 80983 | 39652 | 19376 |

TABLE 3

| Ex # | CH2/Chain (Based on Mn) | % Vinyls/Chain (Based on Mn) | % Cis-Trans/Chain (Based on Mn) | % Trisub/Chain (Based on Mn) | % Vinylidenes/Chain (Based on Mn) | % Sat. Chain Ends by Difference | % of Chains with Unsat. End Groups* | (% Vinyls + Cis/Trans) Per Chain |
|---|---|---|---|---|---|---|---|---|
| Ex 1 | 465 | 5 | 12 | 12 | 11 | 73 | 27 | 17 |
| Ex 2 | 382 | 5 | 21 | 21 | 15 | 60 | 40 | 26 |
| Ex 3 | 1050 | 4 | 10 | 10 | 9 | 77 | 23 | 14 |
| Ex 4 | 114 | 3 | 16 | 16 | 6 | 75 | 25 | 19 |
| Ex 5 | 564 | 13 | 26 | 26 | 12 | 49 | 51 | 39 |
| Ex 6 | 24 | 1 | 12 | 12 | 24 | 63 | 37 | 13 |
| Ex 7 | 254 | 5 | 27 | 27 | 18 | 49 | 51 | 33 |
| Ex 8 | 386 | 18 | 20 | 20 | 26 | 36 | 64 | 38 |
| Ex 9 | 61 | 2 | 14 | 14 | 24 | 59 | 41 | 17 |
| Ex 10 | 69 | 1 | 10 | 10 | 23 | 66 | 34 | 11 |
| Ex 11 | 416 | 5 | 13 | 13 | 9 | 73 | 27 | 18 |
| Ex 12 | 436 | 10 | 17 | 17 | 12 | 61 | 39 | 27 |
| Ex 13 | 321 | 8 | 13 | 13 | 15 | 63 | 37 | 22 |
| Ex 14 | 800 | 17 | 18 | 18 | 14 | 51 | 49 | 35 |
| Ex 15 | 273 | 6 | 20 | 20 | 9 | 66 | 34 | 25 |
| Ex 16 | 176 | 5 | 14 | 14 | 9 | 72 | 28 | 19 |
| Ex 17 | 284 | 1 | 0 | 0 | 2 | 97 | 3 | 1 |
| Ex 18 | 146 | 0 | 0 | 0 | 1 | 99 | 1 | 0 |
| Ex 19 | 89 | 1 | 0 | 0 | 4 | 95 | 5 | 1 |
| Comp Ex 1 | 1086 | 5 | 27 | 27 | 14 | 53 | 47 | 33 |
| Comp Ex 2 | 3057 | 46 | 19 | 19 | 16 | 20 | 80 | 65 |
| Comp Ex 3 | 950 | 15 | 10 | 10 | 5 | 70 | 30 | 25 |
| Comp Ex 4 | 1879 | 45 | 13 | 13 | 16 | 26 | 74 | 58 |
| Comp Ex 5 | 3214 | 52 | 33 | 33 | 22 | −7 | 107 | 85 |
| Comp Ex 6 | 7414 | 10 | 24 | 24 | 21 | 44 | 56 | 35 |
| Comp Ex 7 | 1157 | 19 | 25 | 25 | 15 | 42 | 58 | 43 |
| Comp Ex 8 | 1164 | 22 | 22 | 22 | 18 | 38 | 62 | 44 |

*(Not Counting Trisub)

Table 3 shows results of endgroup analysis of these polymers in terms of the % vinyls/chain, % cis-trans/chain (vinylene), the % trisubstitution per chain, and the % vinylidenes/chain. The % saturated chain ends are all those excluding the cis-trans, vinyls, and vinylidenes. The % of chains with unsaturation is 100%-% saturated chain ends. The vinyl levels are low (less than 20% for the polymers of this invention), with many having vinyl levels lower than 10%. The ethylene/propylene samples made (Ex. 17-19) showed essentially no (1% or less) vinyls. Materials with low vinyl levels have very good thermal stability, and show little degradation over time at elevated temperature. In contrast, the comparative examples in general have higher vinyl levels.

Gel-Like Polymer Examples 20-25

A series of gel-like polymers were prepare using the same process as used to prepare the homogeneous liquid low molecular weight ethylene/alpha olefin polymers of Examples 1-19. Table 4 summaries the process condition, Table 5 the polymer properties and Table 6 the levels of unsaturation in the polymer.

The gel-like polymers are distinguished from the liquid polymers by their higher crystallinities and lower vinylidene content.

TABLE 4

| Ex # | Reactor Temp °C. | Solvent Flow lb/hr | Ethylene Flow lb/hr | Octene Flow lb/hr | Propylene Flow lb/hr | Hydrogen Flow scccm | C2 Conversion (%) | B*/Ti Molar Ratio | MMAO$^a$/Ti Molar Ratio | Catalyst |
|---|---|---|---|---|---|---|---|---|---|---|
| 20 | 100.4 | 32 | 2.50 | 4.00 | — | 77.9 | 89.70 | 1.08 | 5.03 | 3 |
| 21 | 99.0 | 32 | 2.50 | 4.00 | — | 229.87 | 89.79 | 1.02 | 4.79 | 3 |
| 22 | 99.9 | 32 | 2.50 | 4.00 | — | 698.9 | 89.67 | 1.07 | 5.08 | 3 |
| 23 | 100.4 | 22 | 2.50 | — | 1.18 | 130.90 | 90.13 | 1.24 | 4.11 | 3 |
| 24 | 99.7 | 22 | 2.50 | — | 1.17 | 293.03 | 90.10 | 1.19 | 3.84 | 3 |
| 25 | 100.1 | 22 | 2.50 | — | 1.18 | 749.67 | 89.72 | 1.16 | 3.91 | 3 |

TABLE 5

| Ex # | Mw | Mn | Mw/Mn | Comonomer (Mol %) | Pour Point (°C.) | Crystallinity (%) | ΔH (J/g) | Tm (°C.) |
|---|---|---|---|---|---|---|---|---|
| 20 | 15,400 | 7,390 | 2.08 | 19.5 | 39 | 11 | 31.09 | 6.83 |
| 21 | 6,640 | 2,680 | 2.48 | 18.4 | 33 | 12 | 34.1 | 8.49 |
| 22 | 2,310 | 960 | 2.41 | 17.4 | 39 | 11 | 31.9 | 13.06 |
| 23 | 11,400 | 4,410 | 2.59 | 15.6 | 78 | 26 | 76.28 | 47.49 |
| 24 | 5,530 | 2,210 | 2.50 | 16.1 | 69 | 32 | 94.13 | 40.55 |
| 25 | 2,080 | 900 | 2.31 | 16.6 | 66 | 32 | 94.83 | 28.54 |

| Ex # | Tc(°C.) | Tg(°C.) | Visc 60°C. (cP) | Visc 100°C. (cP) | Visc 125°C. (cP) | Visc 150°C. (cP) | Visc 177°C. (cP) |
|---|---|---|---|---|---|---|---|
| 20 | 0.28 | −66.74 | 95180 | 14677 | 6179 | 3197 | 1659 |
| 21 | 6.00 | −68.49 | 9358 | 1503 | 587 | 322 | 178 |
| 22 | 9.17 | −76.58 | 958 | 124 | 61 | 36 | 22 |
| 23 | 60.96 | −41.67 | not melted | 16856 | 5759 | 3239 | 1824 |
| 24 | 66.21 | −45.89 | not melted | 1011 | 440 | 264 | 159 |
| 25 | 29.86 | −55.25 | >100000 | 102 | 50 | 31 | 20 |

TABLE 6

| Ex # | CH2/Chain (Based on Mn) | % Vinyls/Chain (Based on Mn) | % Cis-Trans/Chain (Based on Mn) | % Trisub/Chain (Based on Mn) | % Vinylidenes/Chain (Based on Mn) | % Sat. Chain Ends by Difference | % of Chains with Unsat. End Groups* | (% Vinyls + Cis/Trans) Per Chain |
|---|---|---|---|---|---|---|---|---|
| 20 | 528 | 1 | 2 | 2 | 6 | 92 | 8 | 2 |
| 21 | 191 | 0 | 0 | 0 | 2 | 98 | 2 | 1 |
| 22 | 69 | 0 | 0 | 0 | 1 | 99 | 1 | 0 |
| 23 | 315 | 1 | 0 | 0 | 1 | 98 | 2 | 1 |
| 24 | 158 | 0 | 0 | 0 | 1 | 99 | 1 | 0 |
| 25 | 64 | 0 | 0 | 0 | 0 | 100 | 0 | 0 |

The invention claimed is:

1. A homogeneous, liquid, low molecular weight ethylene/octene copolymer, wherein the copolymer consists essentially of polymerized ethylene and 1-octene monomeric units, and wherein greater than 95 percent of the copolymer's short chain branches are hexyl branches, and wherein the copolymer has the following properties:

a) a number average molecular weight (Mn), as determined by gel permeation chromatography, of less than 25,000;

b) a total crystallinity, as measured by DSC, of less than 10%;

c) a pour point, as measured by ASTM D97, of less than 50° C., and wherein the polymer is prepared in the presence of a constrained geometry catalyst, of the Formula III:

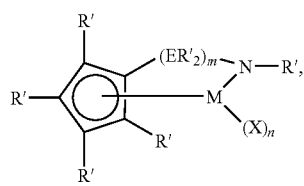

Formula III wherein:

M is titanium, zirconium or hafnium, bound in an $\eta^5$ bonding mode to the cyclopentadienyl group;

R' each occurrence is independently selected from the group consisting of hydrogen, silyl, alkyl, aryl, and combinations thereof, having up to 10 carbon or silicon atoms;

E is silicon or carbon;

X independently each occurrence is hydride, halo, alkyl, aryl, aryloxy or alkoxy of up to 10 carbons;

m is 1 or 2; and n is 1 or 2 depending on the valence of M.

2. A pour-point reducing additive comprising the homogeneous, liquid, low molecular weight ethylene/octene copolymer of claim 1.

3. The homogeneous, liquid, low molecular weight ethylene/octene copolymer of claim 1, wherein the copolymer has a total crystallinity less than 7%.

4. The homogeneous, liquid, low molecular weight ethylene/octene copolymer of claim 1, wherein the copolymer has a total crystallinity less than 5%.

5. The homogeneous, liquid, low molecular weight ethylene/octene copolymer of claim 1, wherein the copolymer has a total crystallinity less than 2%.

6. The homogeneous, liquid, low molecular weight ethylene/octene copolymer of claim 1, wherein the copolymer has a number average molecular weight (Mn) less than 11,000 g/mole.

7. The homogeneous, liquid, low molecular weight ethylene/octene copolymer of claim 1, wherein the copolymer has a number average molecular weight (Mn) less than 9,000 g/mole.

8. The homogeneous, liquid, low molecular weight ethylene/octene copolymer of claim 1, wherein the copolymer has a number average molecular weight (Mn) less than 5,000 g/mole.

9. The homogeneous, liquid, low molecular weight ethylene/octene copolymer of claim 1, wherein the copolymer has a comonomer incorporation greater than 30 mol percent.

10. The homogeneous, liquid, low molecular weight ethylene/octene copolymer of claim 1, wherein the copolymer has a comonomer incorporation greater than 40 mol percent.

* * * * *